US011088608B2

(12) United States Patent
Kaul

(10) Patent No.: US 11,088,608 B2
(45) Date of Patent: Aug. 10, 2021

(54) SELF-PROPELLING SYSTEM

(71) Applicant: HYPERBOLIC ENGINES INCORPORATED, San Bruno, CA (US)

(72) Inventor: Anoup Kaul, San Bruno, CA (US)

(73) Assignee: Pathfinder Propulsion LLC, Denver, CO (US)

( * ) Notice: Subject to any disclaimer, the term of this patent is extended or adjusted under 35 U.S.C. 154(b) by 651 days.

(21) Appl. No.: 15/765,673

(22) PCT Filed: Oct. 7, 2016

(86) PCT No.: PCT/US2016/056146
§ 371 (c)(1),
(2) Date: Apr. 3, 2018

(87) PCT Pub. No.: WO2017/062881
PCT Pub. Date: Apr. 13, 2017

(65) Prior Publication Data
US 2019/0089235 A1    Mar. 21, 2019

Related U.S. Application Data

(60) Provisional application No. 62/284,762, filed on Oct. 8, 2015, provisional application No. 62/389,340, filed on Feb. 22, 2016.

(51) Int. Cl.
*H02K 53/00* (2006.01)
*H02K 49/10* (2006.01)
(Continued)

(52) U.S. Cl.
CPC ............... *H02K 53/00* (2013.01); *H02K 7/11* (2013.01); *H02K 16/00* (2013.01); *H02K 49/102* (2013.01); *H02N 11/008* (2013.01)

(58) Field of Classification Search
CPC .......... G02B 7/00; G02B 7/005; G02B 7/006; G02B 26/00; G02B 26/008; H02K 21/00;
(Continued)

(56) References Cited

U.S. PATENT DOCUMENTS 3,895,245 A * 7/1975 Bode ...................... H02K 25/00
310/46
5,172,784 A 12/1992 Varela, Jr.
(Continued)

FOREIGN PATENT DOCUMENTS

WO        2013045676 A2     4/2013

OTHER PUBLICATIONS

Written Opinion of the International Searching Authority dated Dec. 16, 2016.
(Continued)

*Primary Examiner* — Tran N Nguyen
*Assistant Examiner* — Leda T Pham
(74) *Attorney, Agent, or Firm* — Robinson IP Law, PLLC

(57) ABSTRACT

A self-propelling method includes providing an impulse to a first magnet, the first magnet having angular momentum about a first point subsequent to the impulse, and inducing a change in angular momentum of a second magnet in response to magnetic attraction with the first magnet, the second magnet rotating about a second point, so that the first and second magnets are rotatably coupled to a rigid vehicle platform at the first and second points, and the inducing a change in angular momentum of the second magnet results in a transferred linear impulse of rigid vehicle platform in a first direction.

25 Claims, 22 Drawing Sheets

(51) Int. Cl.
*H02K 7/11* (2006.01)
*H02K 16/00* (2006.01)
*H02N 11/00* (2006.01)

(58) Field of Classification Search
CPC ........ H02K 49/10; H02K 51/00; H02K 1/278; H02K 7/106; H02K 21/029; H02K 21/14; H02K 49/106; H02K 49/108; H02K 53/00; F16C 39/063
See application file for complete search history.

(56) References Cited

U.S. PATENT DOCUMENTS

| | | | |
|---|---|---|---|
| 5,233,251 A * | 8/1993 | Nehmer | H02K 25/00 |
| | | | 310/167 |
| 6,231,011 B1 | 5/2001 | Chu et al. | |
| 7,791,441 B1 | 9/2010 | Jefferson | |
| 9,413,214 B2 * | 8/2016 | Giummo | H02K 21/00 |
| 2008/0024017 A1* | 1/2008 | Chen | H02K 53/00 |
| | | | 310/36 |
| 2012/0120516 A1 | 5/2012 | Harrell et al. | |
| 2013/0147298 A1 | 6/2013 | Giummo | |
| 2014/0203678 A1 | 7/2014 | Haggard | |
| 2019/0089235 A1 | 3/2019 | Kaul | |

OTHER PUBLICATIONS

International Search Report and Written Opinion of the International Search Authority for International Application No. PCT/US2020/028943, dated Jul. 27, 2020.

* cited by examiner

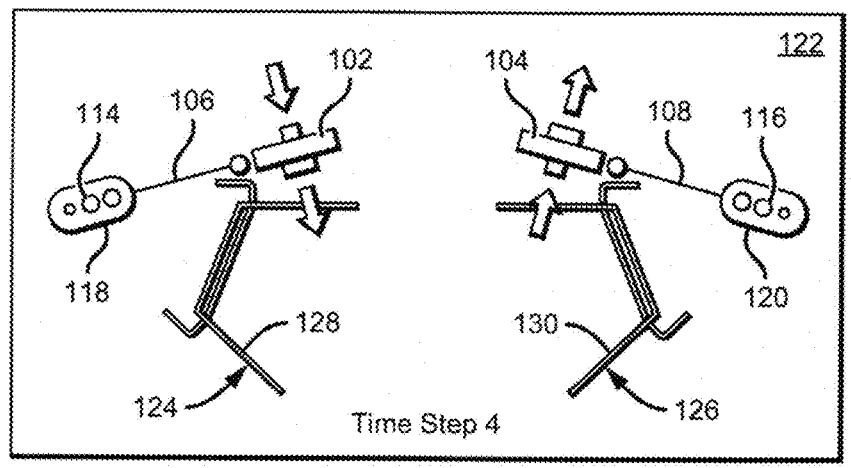
FIG. 1D
FIG. 1E
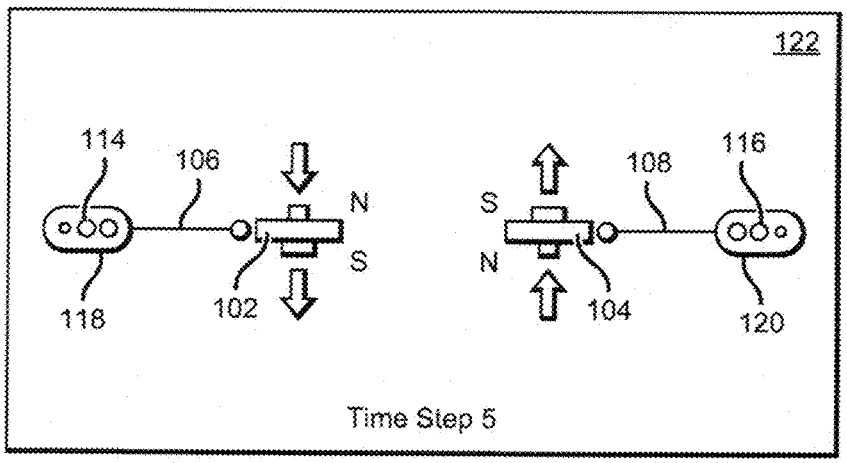
FIG. 1F
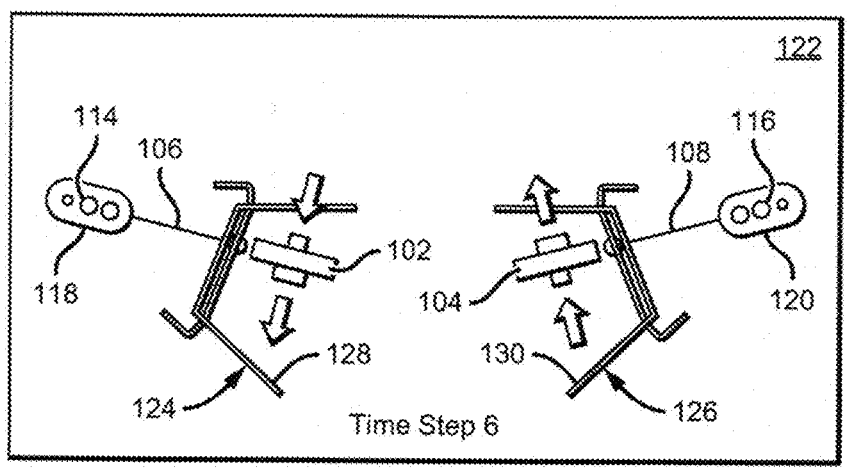

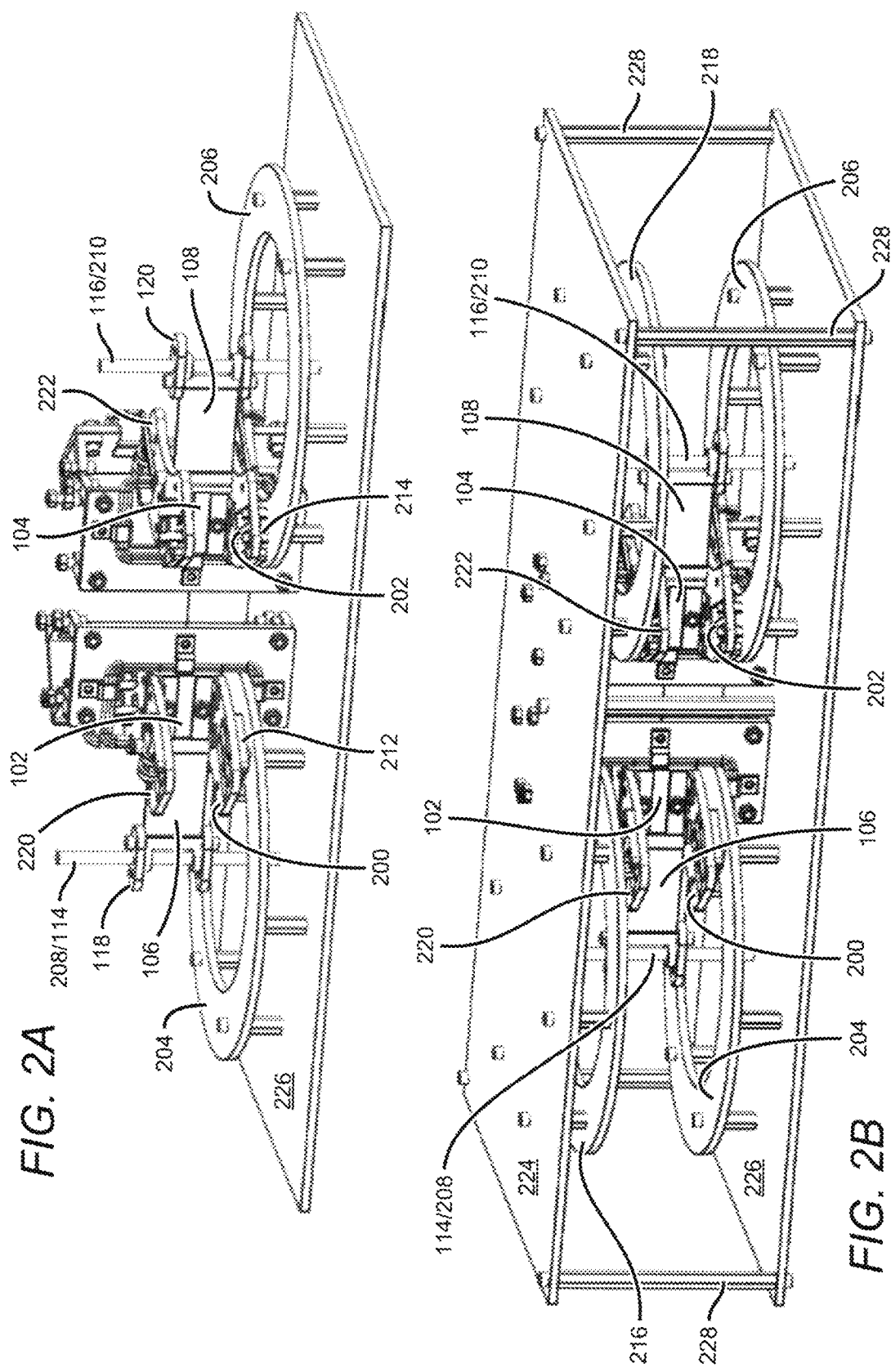

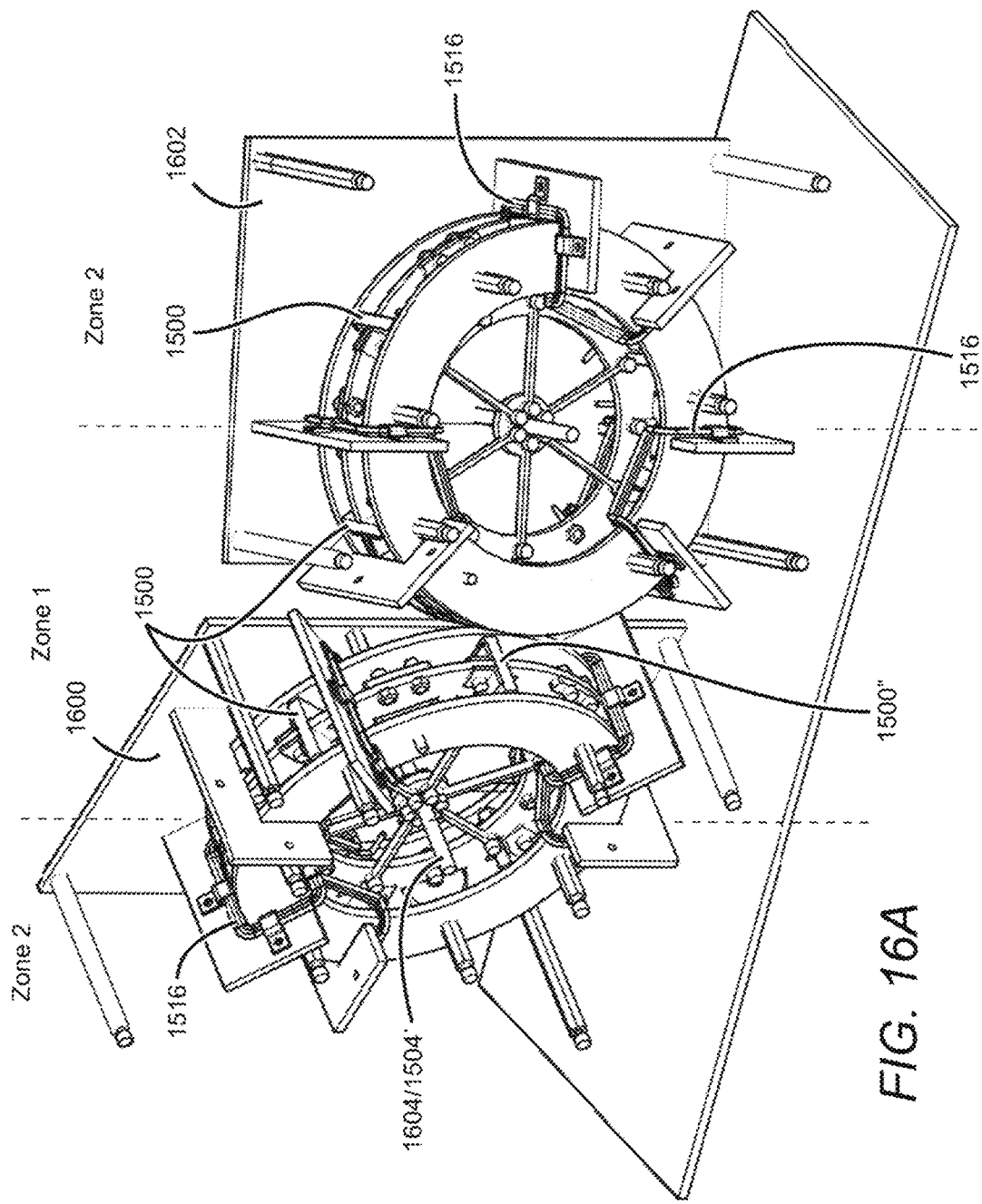

SELF-PROPELLING SYSTEM

CROSS-REFERENCE TO RELATED APPLICATIONS

This patent application is a U.S. National Phase Patent Application under 35 U.S.C. § 371 of International Application Number PCT/US2016/056146 filed Oct. 7, 2016, which claims priority to U.S. Provisional patent application No. 62/284,762 filed Oct. 8, 2015 and U.S. Provisional patent application No. 62/389,340 filed Feb. 22, 2016, and each are incorporated by reference herein in their entirety for all purposes.

BACKGROUND

Field of the Invention

The field of the invention relates to propulsion systems, and more particularly to propulsion systems intended for use in the vacuum of space, such as spacecraft propulsion, or intended for use with watercraft.

Description of the Related Art

Spacecraft Propulsion

Spacecraft have an established heritage over the last 50+ years. They have been used to conduct research on the earth and other celestial bodies, provide communication services that cover the globe and even carry men to the moon. In addition, efforts have begun that seek to mine asteroids for precious metals and resources. While there have been many advances in all of the critical systems required to accomplish a given space mission, the in-space propulsion system has remained largely unchanged since our first launches.

A critical short-coming of the current propulsion technology is the need to use fuel or propellant to generate thrust. This reliance on fuel has led to added complexity and cost to spacecraft design specifically the need to include fuel tanks and fuel line routing, filtering, valves and flow gauges. These system elements add substantially to the spacecraft mass. And because spacecraft launch mass is a critical component in determining launch costs we see the current state of technology is economically inefficient. In addition, the operational life of most spacecraft is dictated primarily by fuel consumption because once the fuel tank is empty there is no way to refill it.

With the maturation of reliable miniaturized electronics, satellite bus structures have decreased in size as well. While small (micro/nano) in size, these vehicles can still provide a powerful platform for communications, earth observation and interplanetary adventures. Unfortunately, fuel based propulsion systems do not scale down in size very well which has left small/micro/nano spacecraft without thruster capabilities. Without propulsion, smaller buses operating lifetimes are severely limited and deep space missions are near impossible or require excessive complexity.

Finally, all fuel based propulsion technology is limited to generating thrust in only one direction.

Accordingly, there exists a need for a spacecraft thruster that includes features that address fuel, bi-directionality and scalability. An optimum solution would allow straightforward mechanical and electrical integration into the current satellite designs along with accommodating new smaller spacecraft.

Spacecraft Reaction Wheel

During spacecraft operation there is a need to change angular orientation for communication and/or observation alignment. Similar to issues surrounding spacecraft propulsion, the need to use fuel or propellant to generate thrust adds to space complexity, does not scale well with small satellite bus structures of the future, and limits operational life. A need continues to exist for reducing the mass of propellant necessary to support spacecraft changes in angular orientation for any given satellite bus size and operational lifetime.

Small Fishing Boat Propulsion

Weekend anglers are always looking for new ways to surprise their prey. Specifically in shallow water where fishing small electric/gas motors have been used to minimize propeller disturbance of the water and reduce motor noise.

Accordingly, there exists a need to provide propulsion to the small fishing boats that does not disturb the water with propellers.

SUMMARY

A self-propelling method includes providing an impulse to a first magnet, the first magnet having angular momentum about a first point subsequent to the impulse and inducing a change in angular momentum of a second magnet in response to magnetic attraction with the first magnet, the second magnet rotating about a second point, so that the first and second magnets are rotatably coupled to a rigid vehicle platform at the first and second points, and the inducing a change in angular momentum of the second magnet results in a transferred linear impulse of the rigid vehicle platform in a first direction. The method may also include inducing a change in angular momentum of a fourth magnet rotating about the second point in response to magnetic attraction with a third magnet rotating about the first point so that the inducing a change in angular momentum of a fourth magnet rotating about the second point reinforces the linear impulse of the rigid vehicle platform in the first direction. The providing of an impulse to a first magnet may include providing an electromagnetic force to the first magnet. In such embodiments, the first magnet may be coupled to a first rotating disk and the second magnet may be coupled to a second rotating disk. In such embodiments, the second disk may be rotatably coupled to the rigid vehicle platform through a shaft, and the change of angular momentum of the second magnet may have a linear momentum component in the first direction, a component of the linear impulse of the rigid vehicle platform received from the second magnet through the shaft.

Another self-propelling method may include providing a first impulse to a first magnet in a first direction, the impulse inducing movement of the first magnet about a first axis of rotation in a first rotational direction, inducing a second magnet to rotate about a second axis of rotation in a second rotational direction, the first and second magnets inducing an amplified centripetal-induced force component in the first direction in a rigid body coupled between the first and second axis of rotation, and reversing respective rotational directions in the first and second magnets in response to attractive magnetic force between them, the attractive magnetic force inducing a magnetic-induced force component in the rigid body in the first direction so that the rigid body is induced to translate in the first direction despite partial recoil from the first impulse. The step of inducing a second magnet to rotate about a second point in second rotational direction may include providing a second impulse to the second magnet. The step of providing a second impulse to the second magnet may also include generating the second impulse using an electromagnetic force. The first impulse to the first magnet may be generated using an electromagnetic force. The first magnet may be coupled about the first point through a first tether that may include a system of tethers such as a first plurality of tethers. In such embodiments, the second magnet may be coupled about the second point through a second tether that may include a second system of tethers such as a second plurality of tethers. In further embodiments, the method may include providing a plurality of second impulses to the first magnet in the first direction, each of the plurality of second impulses inducing movement of the first magnet about the first axis of rotation in the first rotational direction, providing a plurality of third impulses to the second magnet in the first direction, each of the plurality of third impulses inducing movement of the second magnet about the second axis of rotation in the second rotational direction, and reversing respective rotational directions in the first and second magnets subsequent to each pair of respective second and third impulses in response to attractive magnetic force between the first and second magnets, the attractive magnetic force inducing a magnetic-induced force component in the rigid body in the first direction so that the rigid body experiences acceleration in the first direction despite partial recoil from the second and third impulses. Acceleration of the rigid body in the first direction may be controlled by control of a frequency of the first and second impulses. The first magnet may be coupled about the first point through a rigid disk.

A vehicle may include a first magnet rotatable about a first rotational axis at a radius (R), a second magnet rotatable about a second rotational axis to a position magnetically adjacent to the first magnet, an electromagnetic pulse generator disposed at the radius (R) from the first rotational axis to provide the first magnet with an impulse, a rigid vehicle platform coupled between the first and second magnets so that an electromagnetic impulse provided to the first magnet by the electromagnetic pulse generator results in increased angular momentum of the first magnet, a sharing of a linear momentum component in a first direction between the first and second magnets through magnetic force, and sharing of the linear momentum component in the first direction with the rigid vehicle platform to translate the rigid vehicle platform in the first direction. The first magnet may be disposed on a first rotatable disk. The apparatus may also include a first plurality of first magnets on the first rotatable disk. In such embodiments, the second magnet may be disposed on a second rotatable disk. The apparatus may further include a second plurality of second magnets on the second rotatable disk. The first and second disks may be cooperatively connected to rotate at the same rotational rate. Each of the first and second disks may be first and second rotors, respectively, with each of the first and second rotors having an integrated spur gear profile. The first magnet may be disposed on an armature, and the armature may be a tether that may include a system of tethers. The second magnet may be disposed on an armature, and the armature may be a tether that may include a system of teathers.

A method of providing an angular impulse to a rigid platform may be achieved through the use of recoil forces created on at least one electromagnetic element as the at least one electromagnetic element acts on one or more magnets mounted about a first rotating point. The angular impulse may also be achieved by recoil forces created on the electromagnetic elements as they act on one or more magnets mounted about a second rotating point.

BRIEF DESCRIPTION OF THE DRAWINGS

The components in the figures are not necessarily to scale, emphasis instead being placed upon illustrating the principals of the invention. Like reference numerals designate corresponding parts throughout the different views.

FIGS. 1A-1F depict sequential steps in operation of a self-propelling apparatus having two magnets and respective impulse generators coupled to a vehicle platform;

FIGS. 2A and 2B are side perspective views of one embodiment of a self-propelling apparatus that incorporates the magnets and tether system first illustrated in FIGS. 1A-1F;

FIGS. 16A and 16B depict a non-planar self-propelling apparatus having the tethers, magnets, and impulse generators coupled as first illustrated in FIGS. 15A-15D.

DETAILED DESCRIPTION

Figure 1A:
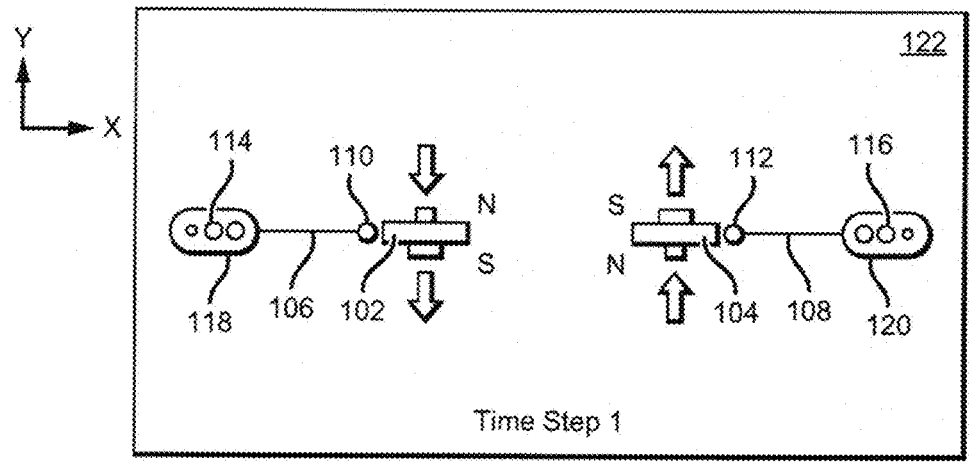

A self-propelling system is disclosed that enables translation of a vehicle platform in space or on water without the need for propellant. An electromagnetic impulse may be applied to a first magnet causing it to rotate about a first rotation axis on a rigid vehicle platform with a given momentum. Magnetic attraction between the first magnet and a second magnet that is rotating about a second rotation axis causes the two magnets to share momentum between them. Because the first and second magnets are both rotatably coupled to the same rigid vehicle platform, force components in a first direction resulting from both centripetal force and magnetic attraction force between the magnets provides the platform with a net positive impulse in the first direction thus allowing the vehicle platform to move without propellant. Such force components in the first direction are additive with subsequent electromagnetic impulses, allowing acceleration of the platform over time.

FIGS. 1A-1F depict sequential steps in operation of a self-propelling apparatus having two magnets and respective impulse generators coupled to a vehicle platform, with each of the two magnets rotatable about a respective axis of rotation through respective tethers. The two magnets (102, 104) may be disposed adjacent to one another and with their magnetic poles (North labeled as "N" and South labeled as "S") oriented such that they attract one another, and coupled to respective tethers (106, 108) through respective pins (110, 112). Each tether (106, 108) may be coupled to its respective shaft (114, 116) through respective bearings (118, 120), with the shafts (114, 116) fixedly coupled to a rigid vehicle platform 122.

As used herein, "rigid platform," "rigid vehicle platform," "platform," or other "rigid body" may refer to a rigid plate, a rigid monocoque structure or other set of fixedly connected rigid components, such as would be provided by metals, metal alloys, or plastics, that provide substantially constant geometric spacing between the shafts or other rotation points and/or axes that support rotation of the magnets about them.

Each tether (106, 108) may be capable of transferring force through tension. In one implementation, the tethers (106, 108) are formed of unidirectional carbon fiber. An electromagnetic pulse generator (124, 126) may be provided for each magnet, and each electromagnetic pulse generator (124, 126) may be fixedly coupled to the vehicle platform 122 and disposed in a position to provide an impulse to its respective magnet as the magnet rotates about its shaft (114, 116) at a pre-determined position. In alternative embodiments, the system may be provided with only one electromagnetic pulse generator for a single magnet.

Referring to FIG. 1A (Time Step 1), the system is illustrated at rest before energizing of the electromagnetic pulse generators (124, 126) (coils are not shown in this time frame), with the tethers (106, 108) and magnets (102, 104) aligned with the X-axis due to the magnetic force between the them and as restrained by the shafts (114, 116) through the tethers (106, 108). As coils (128, 130) of each electromagnetic pulse generator (124, 126) are energized, each magnet is provided with a respective impulse resulting in velocity (v) of each magnet in the positive Y-direction. As a result, an equal and opposite impulse is experienced by the coils (128, 130) of the electromagnetic pulse generators (124, 126), resulting in translation of the coils (128, 130) and coupled vehicle platform 122 in the negative Y-direction (i.e., an initial recoil of the vehicle platform 122).

Figure 1B:
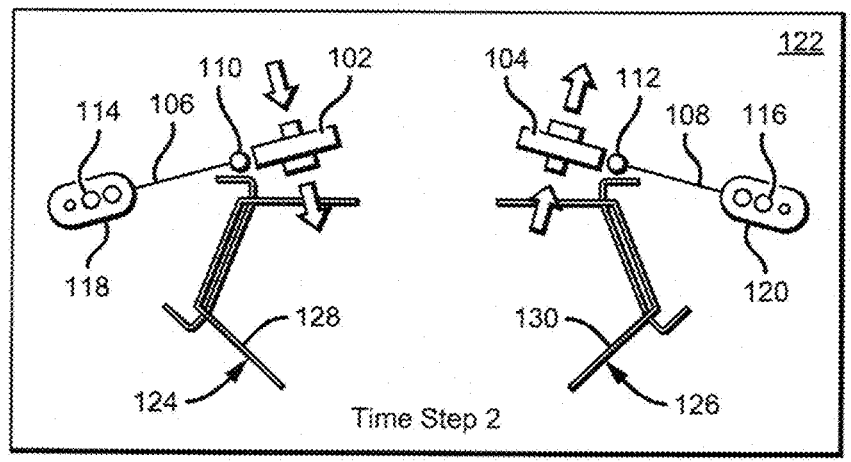

Referring to FIG. 1B (Time step 2), the coils (128, 130) may be de-energized and each magnet continues with its momentum established about its respective shaft (114, 116) through its respective tether up through an intermediate deflection angle ($\theta$) with the X-axis. A tangential component (D) of the magnetic force (F_mag) existing between the magnets (102, 104) begins to slow the angular velocity ($\omega$) of each magnet from what existed immediately after cessation of the initial linear impulse. Centripetal force tension ($T_C$) in each of the tethers (106, 108) established by the magnets (102, 104) rotating about their respective shafts (114, 116) may have a Y-axis component ($T_{C-Y}$) that creates an impulse that pulls the coupled shafts (114, 116) and vehicle platform 122 in the positive Y-axis direction. Similarly, the magnetic force (F_mag) between the magnets (102, 104) provides an additional magnetic tension force ($T_m$) in each tether, with such magnetic tension force ($T_m$) having a Y-axis component ($T_{M-Y}$) that creates an additional impulse that pulls the coupled shafts (114, 116) and vehicle platform 122 in the positive Y-axis direction. With total tension in the tether (T) equal to the centripetal force tension ($T_C$) plus the magnetic tension force ($T_m$), the two Y-components of force ($T_{C-Y}$, $T_{M-Y}$) may begin to overcome the initial impulse provided to the vehicle platform 122, resulting in the vehicle platform 122 ceasing its negative Y-axis translation.

Figure 1C:
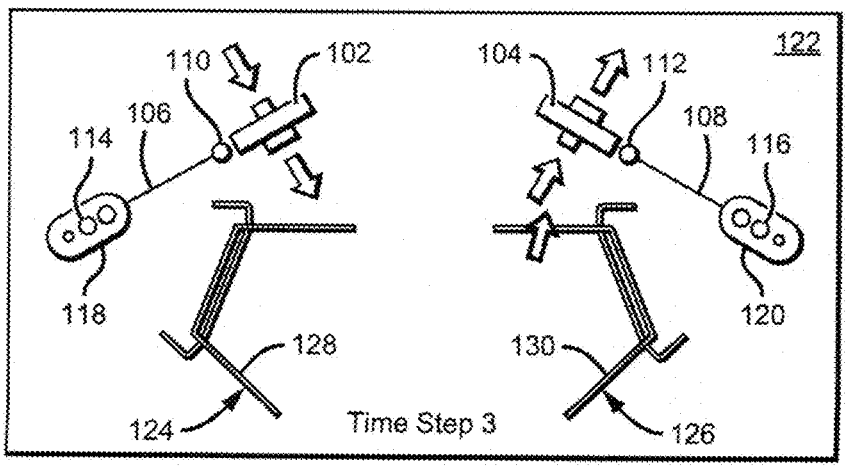

Referring to FIG. 1C, (Time Step 3), the magnets (102, 104) are illustrated as having moved to their maximum deflection angle ($\theta_{max}$) about their respective shafts (114, 116) as measured from their initial positions along the X-axis. The tangential component (D) of the attractive force (F_mag) of the magnets (102, 104) has stopped their angular motion about their respective shafts (114, 116).

Referring to FIG. 1D (Time Step 4), the tangential component (D) of the attractive force (F_mag) has continued to move the magnets (102, 104) back toward their starting position. The magnets' (102, 104) force of attraction (F_mag) maintains the tension in the tethers (106, 108), and the Y-components of both the centripetal force tension ($T_C$) and magnetic force (F_mag) ($T_{C-Y}$, $T_{M-Y}$, respectively) continue to pull the respective shafts (114, 116) and vehicle platform 122 in the positive Y-axis direction.

Referring to FIG. 1E (Time Step 5), the magnets (102, 104) are illustrated as passing through their initial positions, with the magnets (102, 104) and respective tethers (106, 108) in alignment with the X-axis.

Referring to FIG. 1F (Time Step 6), the magnets (102, 104) are illustrated as having momentarily passed their initial positions along the X-axis, but quickly settle back to their initial positions in response to the tangential component (D) of the magnetic force (F_mag) existing between the magnets (102, 104).

As a result of the impulse provided by the Y-components of both the centripetal force tension ($T_C$) and magnetic force (F_mag) ($T_{C-Y}$, $T_{M-Y}$, respectively) acting on the respective shafts (114, 116) and vehicle platform 122 in the positive Y-axis direction during operation, a net positive impulse is imparted to the system and the system will continue moving in the positive Y-axis direction until otherwise acted upon. This cycle can be continued until a desired delta v (velocity) is reached.

In one implementation of the system described in FIGS. 1A-1F, with each magnet being a Neodymium magnet having a mass of 20 grams and dimensions of one inch by one inch by 3/16 inches, a radius (R) of three inches from shaft center line to the center of the magnet, and an initial gap (g) between the magnets' (102, 104) outer edge surfaces of 0.1 inches, the system may have the properties described in Table 1 after application of an initial recoil impulse of 0.13 Newton*sec in the negative Y-axis direction.

TABLE 1

| Deflection Angle (Ø) Degrees | Tension in the tether (T) (radial) Newtons | Decelerating force (D) on magnet Newtons | Vel (v) of magnet m/s | Magnet angular velocity (ω) rad/s | Integral Segment value Newton*s |
|---|---|---|---|---|---|
| 0 | 1.47685 | 0.00000 | 0.66463 | 10.46667 | NA |
| 5 | 1.37059 | 0.11939 | 0.61489 | 9.68324 | 0.00054 |
| 10 | 1.10649 | 0.19204 | 0.52839 | 8.32116 | 0.00155 |
| 15 | 0.79698 | 0.20617 | 0.42034 | 6.61951 | 0.00234 |
| 20 | 0.52910 | 0.18087 | 0.30117 | 4.74290 | 0.00291 |
| 25 | 0.33411 | 0.14113 | 0.17140 | 2.69923 | 0.00357 |
| 30 | 0.20592 | 0.10291 | 0.00513 | 0.08074 | 0.00693 |
| | | | | total | 0.01784 |

It will be noted that the total force transferred to the shaft for deflection of the magnets (102, 104) between 0-30 degrees is 0.0174 Newton*s in the positive Y-axis direction, with this value again transferred to the shaft in the positive Y-axis direction as the magnets (102, 104) travel back to their starting point, for a total value of 0.34 Newton*sec in the positive Y-axis direction. After subtracting the initial recoil impulse of 0.13 Newton*sec (in the negative Y-axis direction), the net force acting on the vehicle platform 122 is 0.021 Newton*sec in the positive Y-axis direction, hence creating positive vehicle platform movement in the positive Y-axis direction.

FIGS. 2A and 2B are side perspective views of one embodiment of a self-propelling apparatus that incorporates the magnets and tether system first illustrated in FIGS. 1A-1F. The magnets (102, 104) may be coupled through respective tethers (106, 108) to respective bearings (118, 120), with the bearings (118, 120) rotatably coupled to respective shafts (114, 116). A rigid vehicle platform may be coupled between the first and second magnets (102, 104) through the associated tethers (106, 108), bearings (118, 120) and shafts (114, 116). Each magnet (102/104) may be positioned magnetically adjacent to the other magnet (104/102), and may be coupled to a "bottom" slider (200, 202) that is operable to slide about a "bottom" ring (204, 206) as the magnet rotates about its respective shaft (208, 210). Although described herein as "sliding," each slider (200, 202) may be provided with respective casters (212, 214) and associated caster support axles (not shown) to vertically support the magnet (102, 104) as the bottom sliders (200, 202) roll along their respective bottom ring (204, 206).

A "top" ring (216, 218) may also be provided (FIG. 2B) to support each magnet as guided by respective "top" sliders (220, 222) as the magnets (102, 104) rotate about their respective shafts (208, 210) to better enable its use without the benefit of gravity. It should be noted that these directional references are placed in quotations because once in orbit "up," "down," "top," "bottom" are free to be set for convenience. Similarly, once in orbit, the sliders (200, 202, 220, 222) will not "rest" on the top and bottom rings (216, 218, 204, 206) but rather float and the rings may provide stability and guide the slides to stay in a single plane of motion.

Each magnet may be provided with an electromagnetic pulse generator having coils for providing an electromagnetic force to the magnets (102, 104) in the form of one or more impulses. An enclosure may house the self-propelling apparatus to provide the apparatus with protection during its installation into a spacecraft and for environment protection in orbit. A "top" rigid vehicle plate 224 (FIG. 2B) may be coupled to a "bottom" rigid vehicle plate 226 via a plurality of rigid supports such as posts 228 to support the assembly. In further embodiments, the "plate" may be a rigid frame to support the assembly, rather than a solid or substantially planar structure such as a plate.

In other planar tethered embodiments (see FIG. 15) the sliders may be extended into a ring and supported by a system of tethers to increase stability of the system when operating in a space environment. Additional magnets and associated electromagnetic coils may be attached to the ring and rigid platform(s) to minimize recoil forces and control reverse swinging motion.

Figure 3:
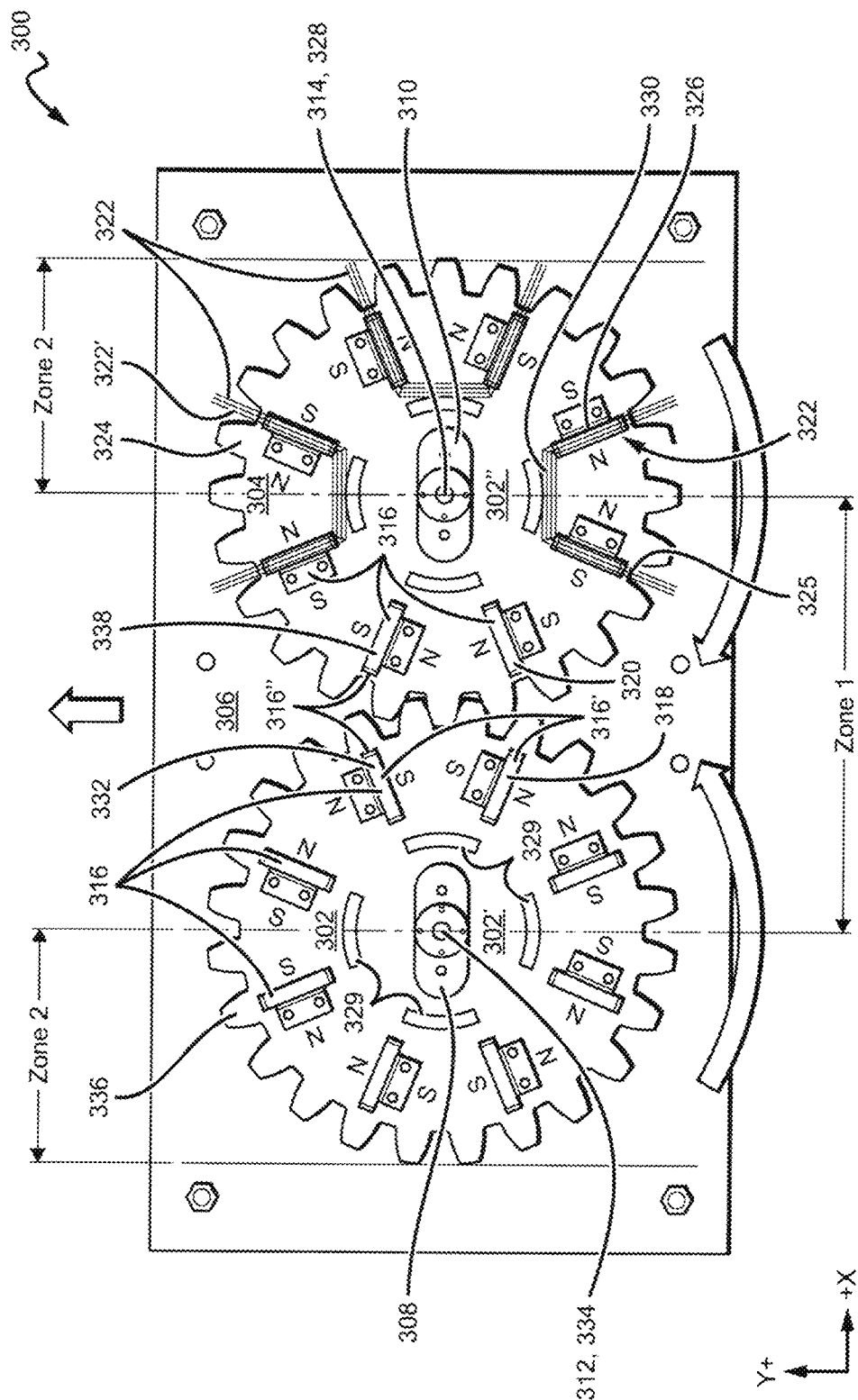
FIG. 3 is a top plan view illustrating primary components of one embodiment of a self-propelling apparatus having a plurality of magnets mounted on a pair of integrated spur gear rotors and using integral electro-magnetic coils for magnet impulses.

FIG. 3 is a top plan view illustrating one embodiment of a self-propelling apparatus having a single pair of interacting synchronized rotors mounted on a rigid vehicle platform, each rotor having an equivalent number of permanent magnets mounted to it, integral electro-magnetic coils to provide impulses to the magnets, and an integrated spur gear outer circumference profile for synchronization. The self-propelling apparatus 300 may have two rotors (302, 304) and are rotatably coupled to the rigid vehicle platform 306 through flanged bearings (308, 310) that guide respective shafts (312, 314) fixedly coupled to the platform 306. In the illustrated embodiment, each of the rotors (302, 304) have spur gear profiles that are cooperatively disposed with one another so that the rotors (302, 304) are rotatable at the same angular velocity during operation. Each of the rotors (302, 304) may have a plurality of circumferentially spaced magnets 316 either disposed on a top surface of each rotor or positioned in a mid-plane arrangement (i.e., extending through each rotor). Although the illustrated implementation has eight magnets, any number of magnets 316 may be used. For example, each rotor (302, 304) may have a single magnet 316 or three magnets 316 equally angularly spaced about each respective rotor (302, 304). Each magnet 316 may be oriented with its North-South poles aligned with an outer circumference of its rotor. Adjacent pairs of magnets 316' on a particular disk are oriented with their poles of similar polarity opposing each other. Adjacent pairs of magnets on adjacent disks 316" are oriented with their poles flipped from one another. By way of example, magnet 318 on rotor 302 is oriented with its South pole facing the forward direction (the forward direction being indicate with an arrow), and magnet 320 on rotor 304 oriented with its North pole facing the forward direction.

The second rotor 304 may have at least one electro-magnetic coil 322' radially cupping over and under the rotor 302". In the illustrated embodiment, three electro-magnetic coils 322 are disposed circumferentially about the second rotor 302", with similar electro-magnetic coils disposed on the first rotor omitted for clarity. On a top side 324 of the second rotor 302", each electro-magnetic coil 322 is positioned to extend over and encompass the magnets 316 as they may be rotated underneath it. Each electromagnetic coil 322 may have first and second upper radial legs (325, 326)

extending radially toward a rotational center 328 of the second rotor 302", and a base leg 330 extending circumferentially at an inner radius of the rotor. The first and second upper radial legs (325, 326) may be formed spaced apart at a position that approximates the spacing of adjacent magnets 316 on the second rotor. The electromagnetic coils 322 may be insulatively coupled to the platform 306 and a current supply. A plurality of rotor position indexes, such as optical sensor arc shaped slots 329, may be disposed circumferentially about each rotor 302, 304. The optical control slots 329 may extend entirely through each disk to enable a control system to detect the rotation rate of each disk.

In alternative embodiments, each spur gear rotor (302, 304) may be replaced with a disk having a smooth outer circumference (i.e., not geared) or with a frame, rather than a disk, that is configured to fixedly hold each magnet 316 in position and for rotation through the electromagnetic coils 322.

During operation, a first impulse may be provided to one or more of the magnets, such as a first magnet 332, the impulse inducing movement of the first magnet 316" about an axis of rotation 334 of the first rotor 302 in a first rotational direction that may be counterclockwise, as the first magnet 332 is coupled to a top surface 336 of the first rotor 302. The first magnet 332 on the first rotor 302 will instantaneously and magnetically interact with a second magnet 338 on the second rotor 304, thereby inducing the second magnet 338 to rotate about the axis of rotation 328 of the second rotor 304 and providing a portion of the momentum of the first magnet 332 to the second magnet 338.

Once both rotors (302, 304) have begun moving in their respective directions, magnets 332 and 318 on the left rotor will pull magnets 338 and 320, respectively, on the right rotor thus inducing them to rotate about the axis of rotation 328 of the second rotor 304. The shared action between these magnets occurs simultaneously to induce an angular and linear impulse component in the forward direction in the platform 306 through shafts (312, 314) of the first and second rotors (302, 304). The momentum imparted to the second magnet 338 will have a Y-component in the +Y direction. While the first and second rotors (302, 304) are spinning in opposite directions with respect to one another, with the first rotor 302 spinning counterclockwise and the second rotor 304 spinning clockwise, the Y-direction component of the resultant momentum exchange between interacting magnets (332/338 and 318/320) in Zone 1 will reinforce in the +Y direction while the X-direction component of the resultant force between the interacting magnets (332/338 and 318/320) in Zone 1 will cancel. This is the case for all magnet pairs travelling on the closer half arcs (Zone 1). The net effect of X-direction component of the magnets on the outer edge Zone 2 will similarly cancel while the Y-direction component of magnets in Zone 2 will be in the −Y-direction. However, because the magnets on the outer edges (Zone 2) are further away from their respective matched pair, the Y-direction component of the resultant momentum exchange between interacting magnets in Zone 2 will be less than the momentum exchange between the magnets in Zone 1. Therefore, the total net effect of the interacting forces on the shafts (312, 314) and platform 306 will be in the +Y direction. The magnetic forces are transferred to the shafts (312, 314) because each rotor (302, 304) is a rigid body and they are rigidly fixed on the platform 306. By using a spur gear profile around the perimeter of each rotor (302, 304) the rate of rotation between the rotors (302, 304) is ensured to be at the same rate.

Figure 4A:
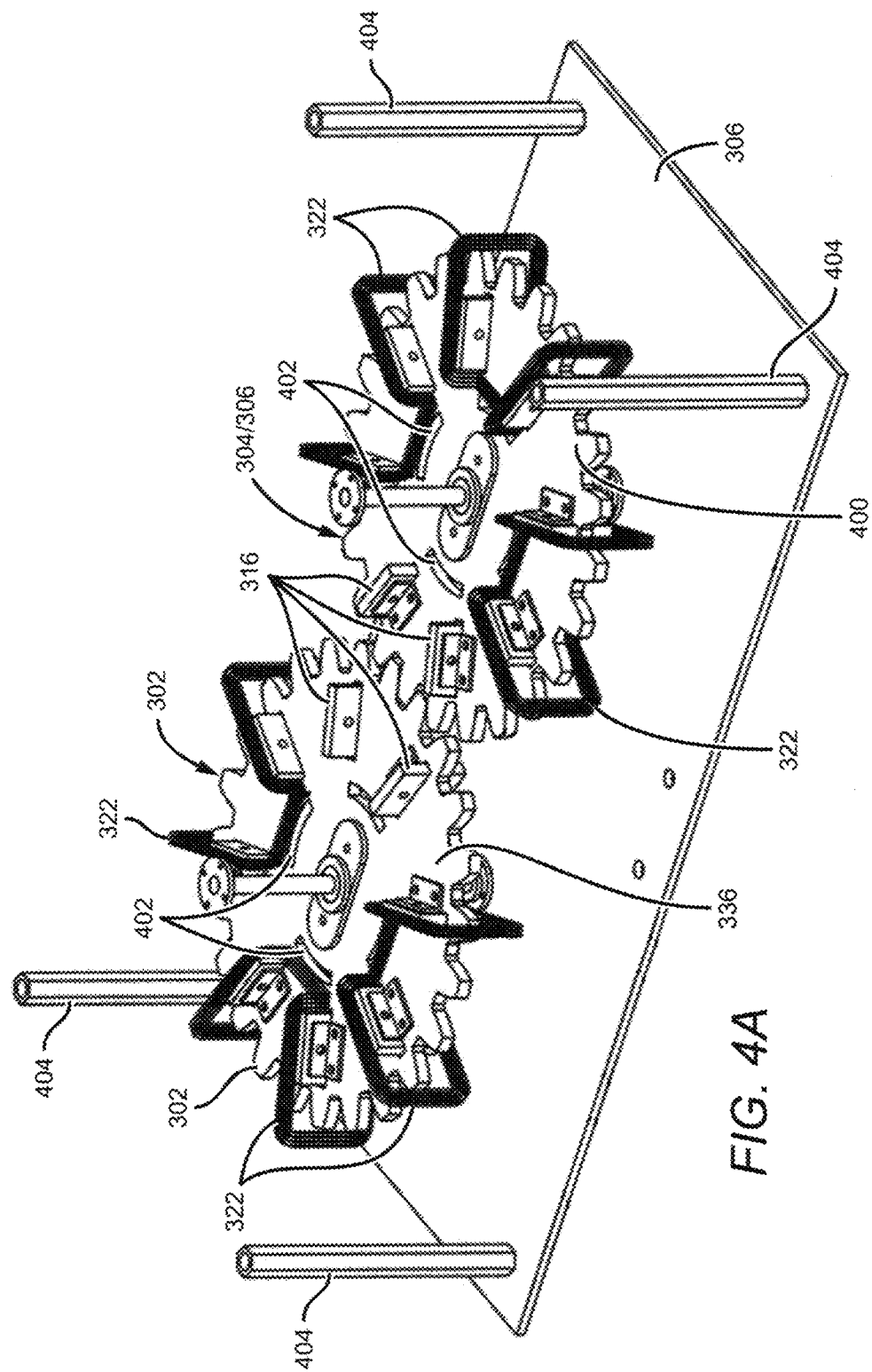
FIGS. 4A, 4B, and 4C are perspective views of the apparatus first illustrated in FIG. 3 as assembled into a more complete assembly showing electro-magnetic coil support brackets and having top and bottom platforms for support of non-propulsion components.
Figure 4B:
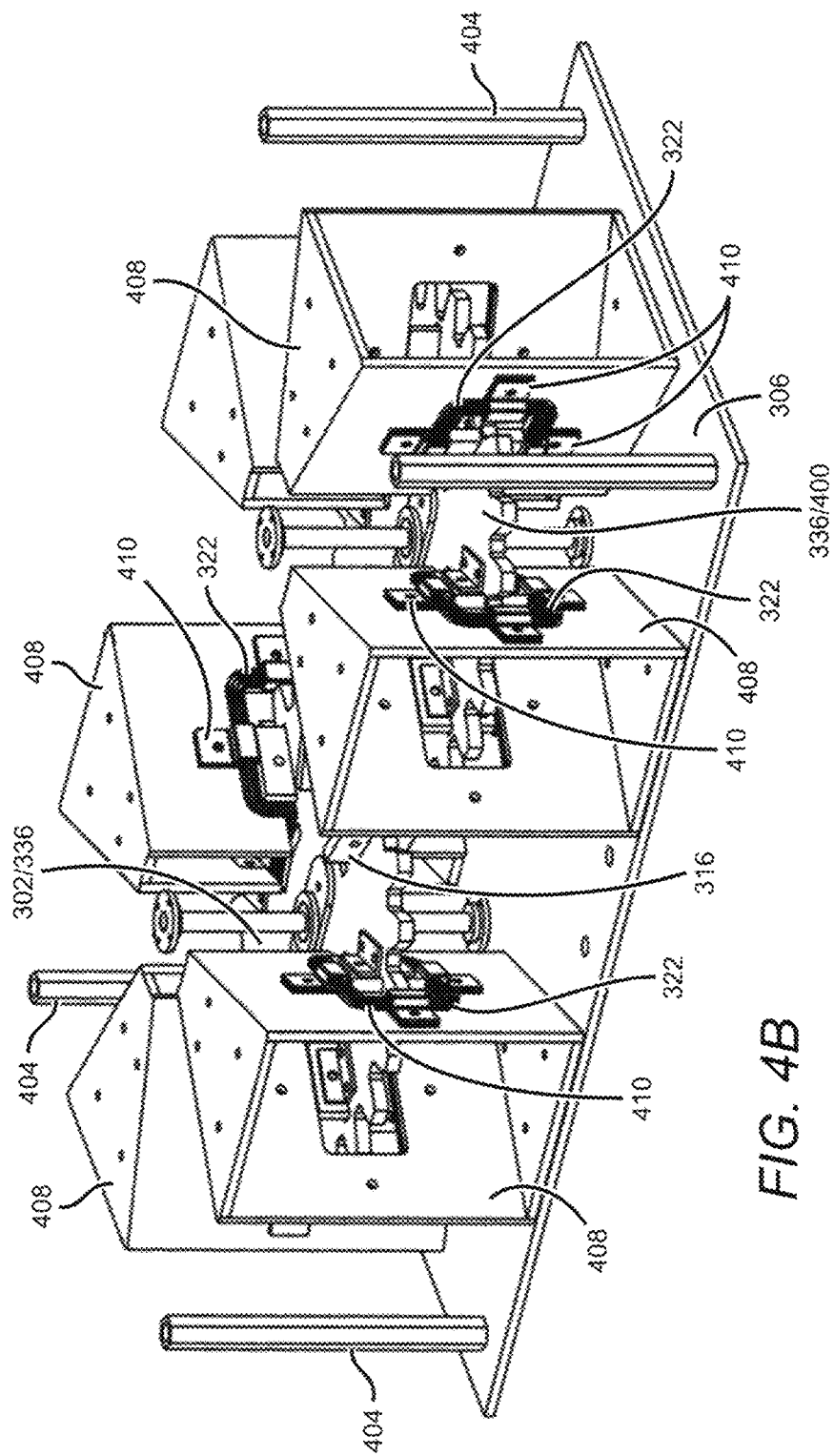
Figure 4C:
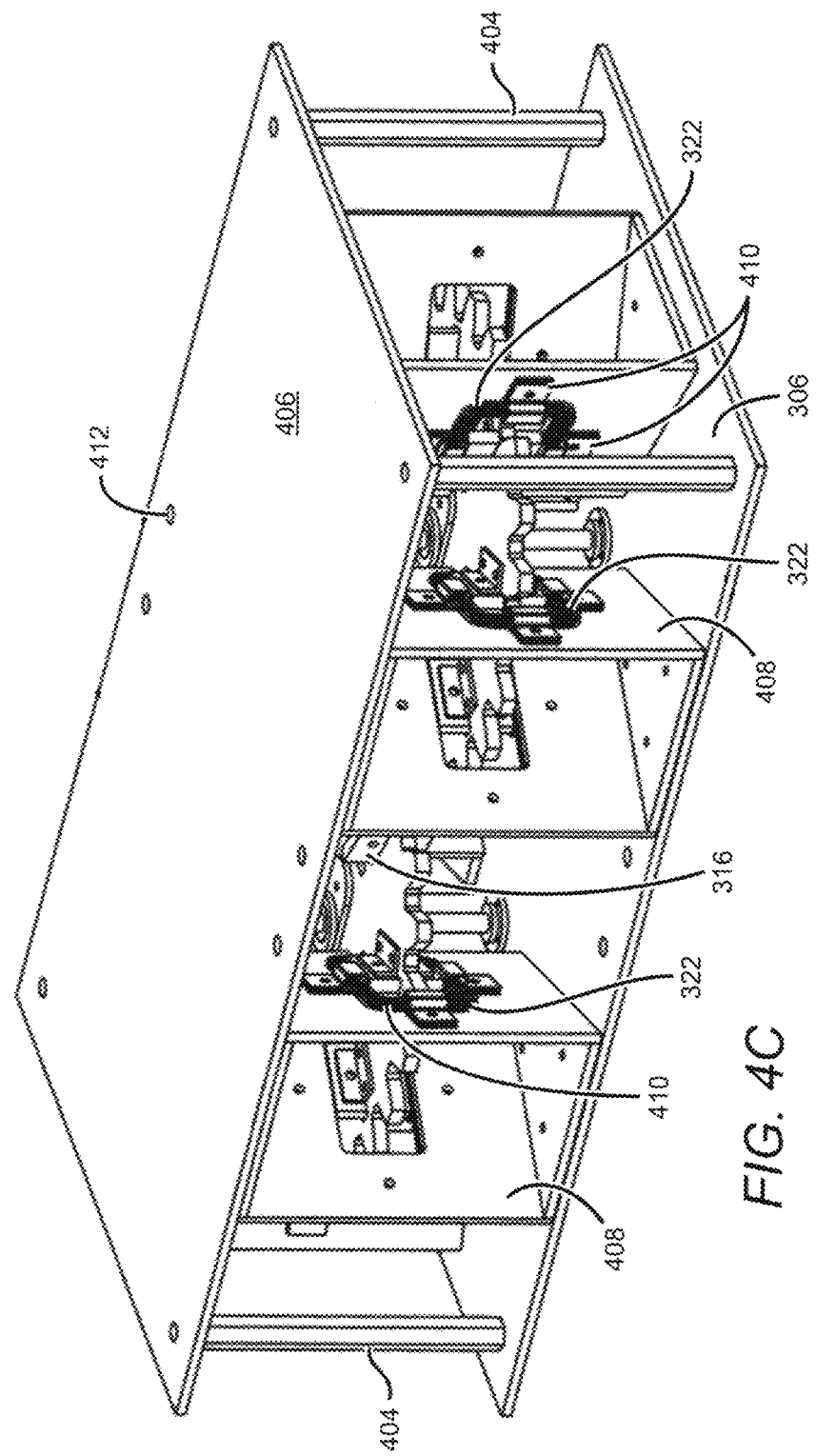

FIGS. 4A, 4B, and 4C are perspective views of the apparatus first illustrated in FIG. 3 as assembled into a more complete assembly showing electro-magnetic coil support brackets and having top and bottom platforms for support of non-propulsion components. The single pair of interacting synchronized rotors (302, 304) may be mounted on the rigid vehicle platform 306. Eight magnets 316 may be coupled to top surfaces (336, 400) of each rotor. Three electromagnetic pulse generators in the form of integral electro-magnetic coils 322 are disposed circumferentially about each of the rotors (302, 304) and extend over and encompass the magnets 316 as they may be rotated underneath them on the top surfaces (336, 400) of each rotor. Optical sensor arc shaped slots 402 may be disposed circumferentially about each rotor (302, 304) and extend entirely through each rotor to enable a photodetector (not shown) to detect the rotation rate of each rotor. Support posts 404 may be coupled between an upper platform 406 (see FIG. 4C) and the lower platform 306. Referring to FIG. 4B, C-Coil support brackets 408 may be coupled to the lower platform 306 or between upper and lower platforms (406, 306), with coil clips 410 coupling electro-magnetic coils 322 to the C-Coil support brackets 408. Mounting points such as threaded holes 412 see FIG. 4C may be available on both plates to attach the apparatus to a vehicle.

Figure 5:
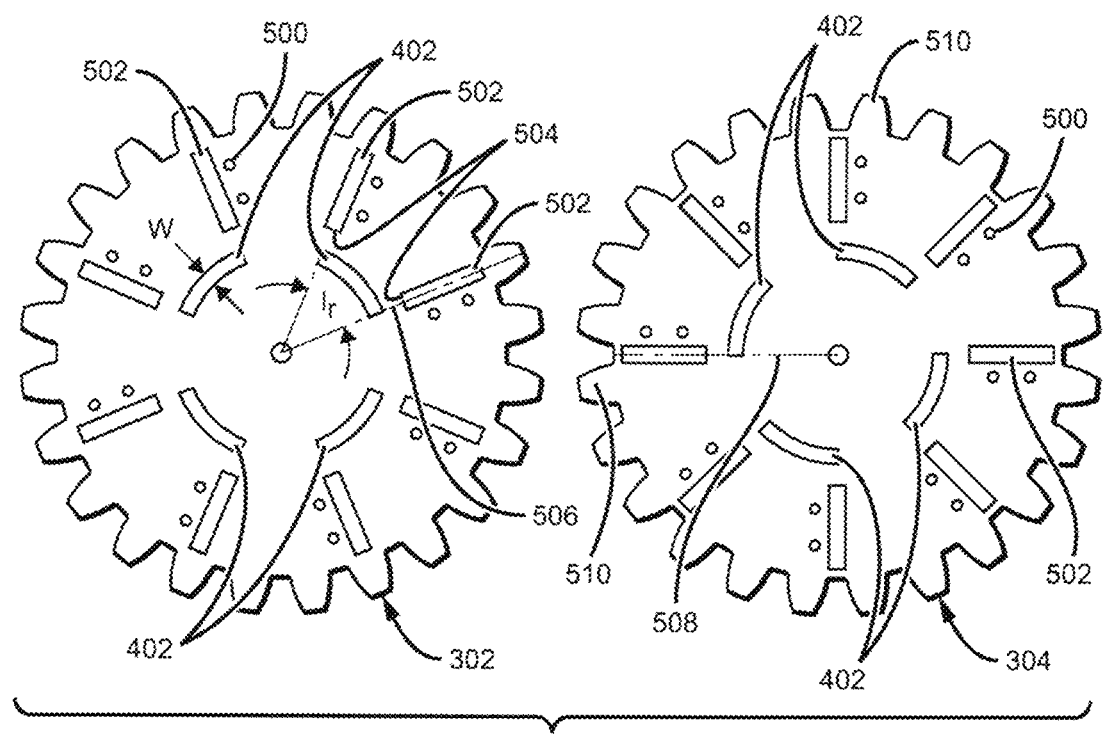
FIG. 5 is an exploded top plan view illustrating rotational alignment of two rotors for use with a self-propelling apparatus, each having a plurality of magnet and optical sensor arc shaped slots.

FIG. 5 is an exploded top plan view illustrating rotational alignment of two rotors for use with a self-propelling apparatus, each having a plurality of magnets and optical sensor arc shaped slots. Magnet mounting holes 500 are circumferentially spaced for mounting respective magnet fixtures (not shown) to hold respective magnets (not shown). Magnet mounting slots 502 are circumferentially spaced apart from one another and extend through each rotor (302, 304), to accept magnets positioned in a mid-plane arrangement (i.e., extending through each rotor). Four optical sensor arc shaped slots 402 having a width (w) and circumferential length ($l_r$) also extend about each rotor (302, 304), with the circumferential length ($l_r$) approximating spanning adjacent inner ends 504 of each magnet. Rotational alignment between magnets otherwise seated in the magnet mounting slots 502 on adjacent rotors may be maintained at one half of the teeth pitch angle shown with phantom lines 506 and 508, respectively, through a spur gear shaped profile 510, to maintain the alignment, where:

Teeth pitch angle=360/total number of teeth on one gear.

Synchronization of one rotor to the other may be maintained using a spur gear shaped profile 510 of each rotor. In alternate embodiments the rotor and synchronization gear element can be separate entities.

Figure 6:
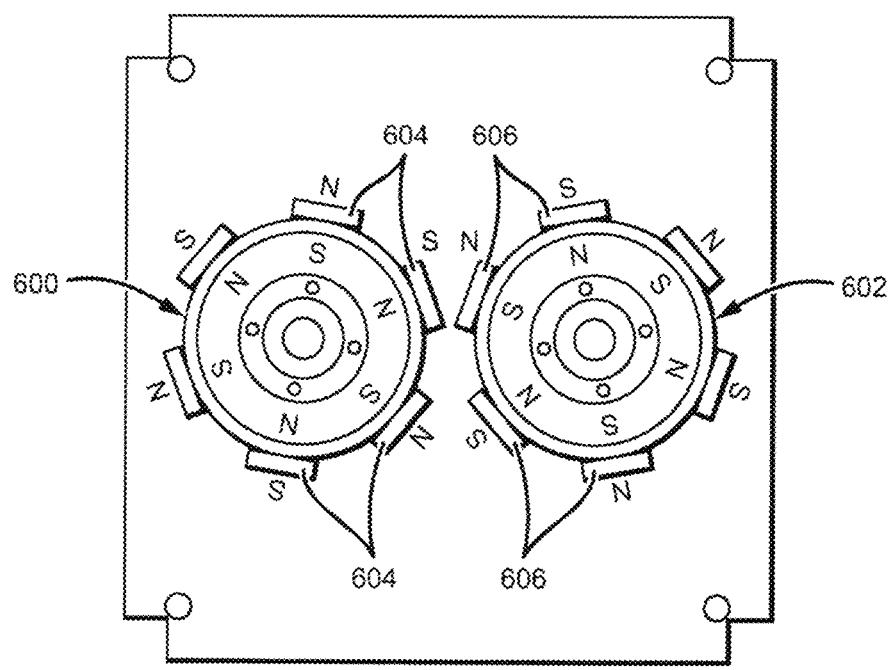
FIG. 6 depicts a top plan view of a self-propelling apparatus having two rotors, with a plurality of magnets on each having their North-South poles oriented radially.

FIG. 6 depicts a top plan view of a self-propelling apparatus that has two rotors rotatably mounted on a platform, with magnets on each rotor having their North-South poles oriented radially on their respective rotor. First and second rotors (600, 602) may be oriented in the same plane and spaced apart from one another but close enough so that magnets 604 on the first rotor, when rotated into position adjacent to the magnets 606 on the second rotor, are magnetically attracted to one another to cause a sharing of momentum between them. In the illustrated embodiment, the rotors (600, 602) do not have a spur gear shaped profile. In alternative embodiments, the rotors may be provided with a spur gear shaped profile or with other synchronization gear element.

Figure 7A:
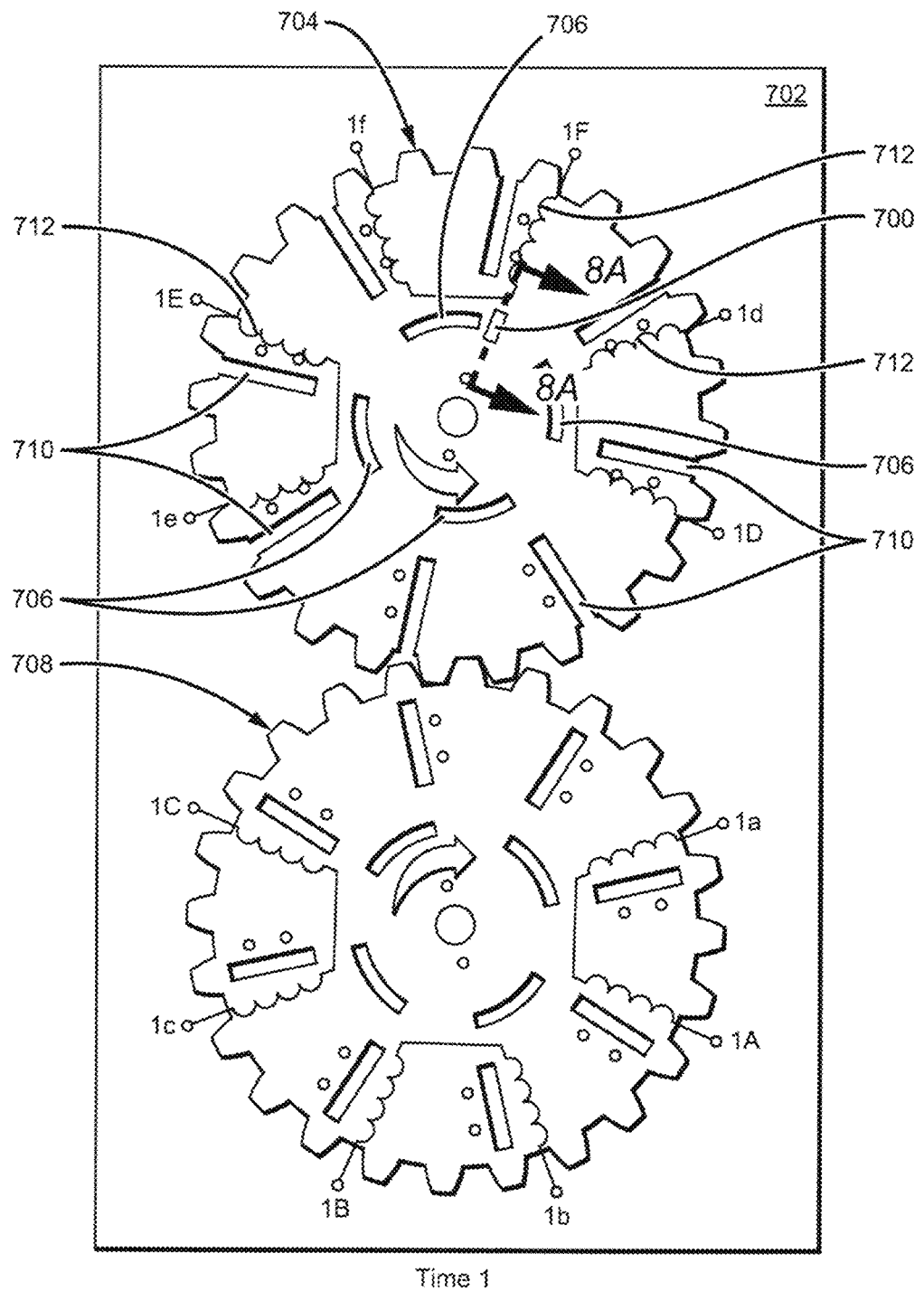
FIGS. 7A and 7B are top plan views depicting the relationship between an optical sensor and the rotor optical slots as first and second rotors rotate from time 1 to time 2.
Figure 7B:
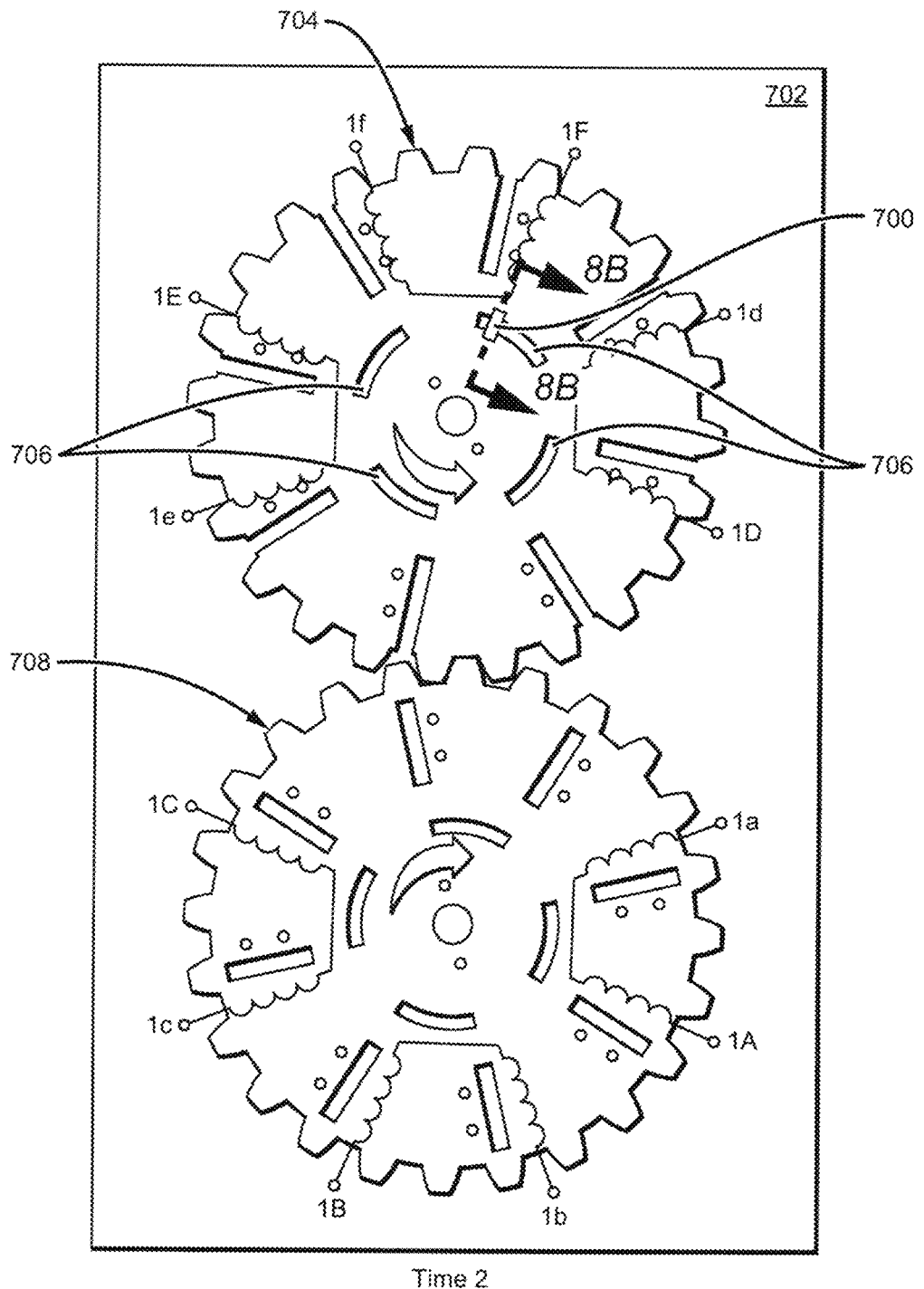

FIGS. 7A and 7B are top plan views depicting the relationship between a proximity sensor and a rotor sensor slots as first and second rotors rotate from Time 1 to Time 2. A proximity sensor 700 may be fixedly coupled to a platform 702 and oriented to direct an interrogating optical beam (not shown) up away from the platform 702 towards the overhead rotor 704. The proximity sensor 700 may be disposed at radial position that corresponds to orbital overhead travel of sensor slots that may be optical sensor arc shaped slots 706 as the rotors (704, 708) rotate from a first rotational position at Time 1 to a second rotational position at Time 2. The optical sensor arc shaped slots 706 may be circumferentially spaced apart such that one optical sensor arc shaped slot is formed abutting inner ends of every other magnet pair. Therefore, with the first rotor 704 having eight magnets 710 attached to the first rotor 704, the first rotor 704 is provided with four optical sensor arc shaped slots 706. Referring to FIG. 7A, the proximity sensor 700 may not be initially aligned with any optical sensor arc shaped slot 706. As the first rotor 704 rotates counterclockwise and induces the second rotor 708 to rotate clockwise, at least one optical sensor arc shaped slot rotates to a position above the interrogating optical beam (not shown) emitted by the proximity sensor 700 to enable angular rotation feedback to an optical sensor circuit (see FIG. 9). Electromagnetic pulse generators having coils 712 may extend radially toward a rotational center of the first rotor 704 to provide an electromagnetic force to the magnets to induce the first rotor to rotate.

Figure 8A:
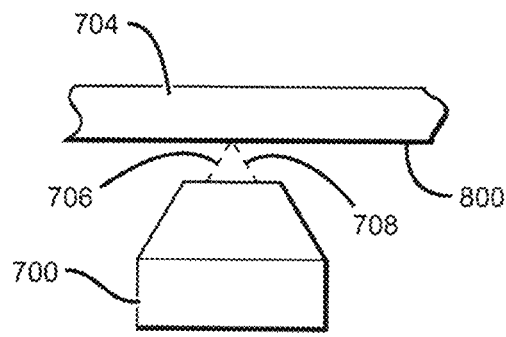
FIG. 8A is a cross sectional view of FIG. 7A along the line A-A depicting the proximity sensor disposed underneath rotating rotor at Time 1, where an optical beam emitted by the proximity sensor is reflected off of an underside of the first rotor.

FIG. 8A is a cross sectional view of FIG. 7A along the line 8A-8A showing reflection of an interrogation beam emitted from the proximity sensor off a bottom surface of the first rotor at Time 1. The proximity sensor 700 is spaced apart from a bottom surface 800 of the first rotor 704 at a predetermined distance that enables the proximity sensor 700 to emit an interrogation beam 706 for reflection and interrogation capture of the reflected beam 708 by the proximity sensor 700. Interrogation capture of the reflected beam 708 indicates the absence of a rotor optical sensor arc shaped slot, and so the proximity sensor may output a signal indicative of the failure to detect such a slot.

Figure 8B:
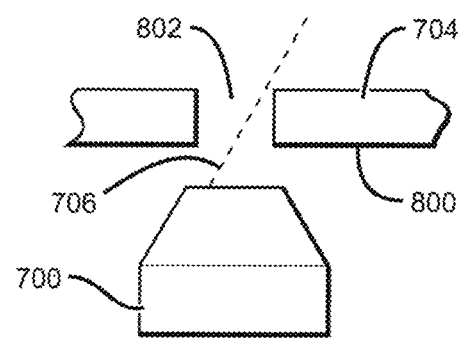
FIG. 8B is a cross sectional view of FIG. 7B along the line B-B depicting the proximity sensor disposed underneath rotating rotor at Time 2, where an optical beam emitted by the proximity sensor is at least partially passed through a rotor optical sensor arc shaped slot.

FIG. 8B is a cross sectional view of FIG. 7B along the line 8B-8B depicting the proximity sensor disposed underneath rotating rotor at Time 2. The interrogation beam continues to be emitted by the proximity sensor, but the interrogation beam travels through the optical slot 802 of the rotor and is not reflected back to the proximity sensor. Because the interrogation beam 706 detects the rotor optical sensor arc shaped slot 802 as it passes overhead due to the lack of detected beam reflection, the proximity sensor 700 may output a signal (not shown) indicative of the slot detection.

Figure 9:
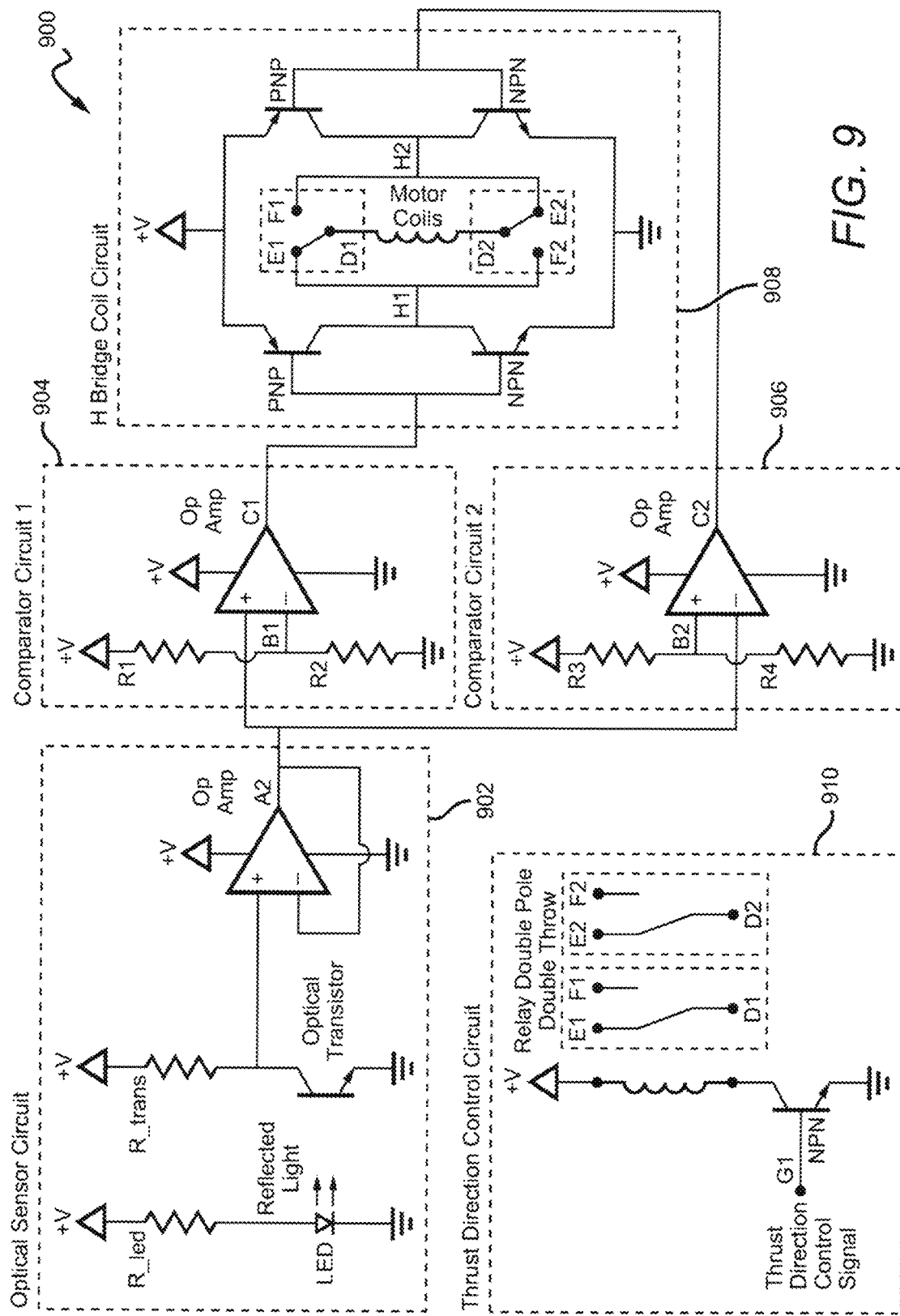
FIG. 9 is a schematic diagram of a uni-polar control circuit that may detect a signal from the proximity sensor of FIGS. 8A and 8B for rotational control of the first disk.

FIG. 9 is a schematic diagram of a uni-polar control circuit that may detect a signal from the proximity sensor of FIGS. 8A and 8B for rotational control of the first disk. The circuit 900 may have three main sections: an optical sensor circuit 902, a pair of comparator circuits (904, 906), and an H bridge transistor circuit 908. Through control of the direction of the coil current, the direction of the desired thrust may also be set, such as by switching a double pole double throw relay circuit 910.

The optical sensor circuit 902 may consist of a resistor (R_led) to adjust the current delivered to the light source (e.g., LED) along with a resistor (R_trans) that limits current through the optical transistor. If the optical sensor circuit 902 detects a signal from the proximity sensor indicating reflection of the interrogation beam (see FIG. 8A), the optical transistor is switched ON and pulls the voltage at point A1 LOW. If the optical sensor circuit detects a signal from the proximity sensor indicating the interrogation beam has traveled through the optical slot of the rotor (see FIG. 8B) and so was not reflected, the voltage at point A1 remains HIGH. The low voltage signal A1 is buffered through an operational amplifier ("Op Amp") and sent from point A2 into the positive input terminal of comparator circuit 1 904 Op Amp and the negative input terminal of comparator circuit 2 906 Op Amp.

Each comparator circuit (904, 906) is comprised of two resistors (e.g., R1 and R2) and an Op Amp. In comparator circuit 1 904 resistors R1 and R2 are configured in a voltage divider arrangement such that the voltage at point B1 is lower than point A2 when the interrogation beam is not reflected (see FIG. 8B) and greater than A2 when the interrogation beam is reflected (see FIG. 8A). In comparator circuit 2 906 resistors R3 and R4 are configured in a voltage divider arrangement such that the voltage at point B2 is higher than point A2 when light is not reflected and lower than A2 when light is reflected. The outputs from the comparator circuits C1 and C2 are fed into the H-bridge circuit 908. When the voltage at C1 is HIGH, current will flow through the NPN transistor in the lower left corner of the H-bridge circuit. At the same time C1 is HIGH the voltage at C2 is LOW and this allows current to flow through the PNP transistor in the upper right hand corner of the H-bridge circuit 908. The current flows from point 112 to 111. If the relay is in state one (D1 switched to E1 and D2 switched to E2) the current will then flow from point E2 to E1 across the coils. As the current flows across the coils the magnets will be pulled or pushed in accordance with the direction of current through the coils.

Referring to FIGS. 7A and 9, the pushing or pulling of the magnets 710 will cause the rotors (704, 708) to spin and the optical slots 706 in the first rotor 704 will either cover and reflect the interrogation beam or uncover and allow the interrogation beam to pass through. With continued reference to FIGS. 7A and 9, the sensor 700 and optical slots 706 are positioned such that the switching occurs when the magnets 710 are centered in the middle of a coil 712. As the magnets 710 are attracted towards the coils 712, the coil current switches from one direction to the opposite direction. When the magnets 710 are in the middle of the coils 712, their momentum along with the now repelling magnetic force of the switched coil current will carry them through the coil center thus ensuring continual motion of the first rotor 704 and rotationally coupled second rotor 708.

Referring to Table 2, the state table summarizing optical slot position, current direction through coils along with relay state, rotor rotation direction and thrust direction can be seen.

TABLE 2

| Sensor light is | Voltage at A1 | Comparator output C1 | Comparator output C2 | Current across coils | | | |
|---|---|---|---|---|---|---|---|
| | | | | Relay State 1 | | Relay State 2 | |
| | | | | From | To | From | To |
| Reflected | Low | High | Low | E2 | E1 | F1 | F2 |
| Passes through | High | Low | High | E1 | E2 | F2 | F1 |
| | | | | Rotation of rotors | | | |
| | | | | Rotor 1 CCW | Rotor 2 CW | Rotor 1 CW | Rotor 2 CCW |

Figure 10:
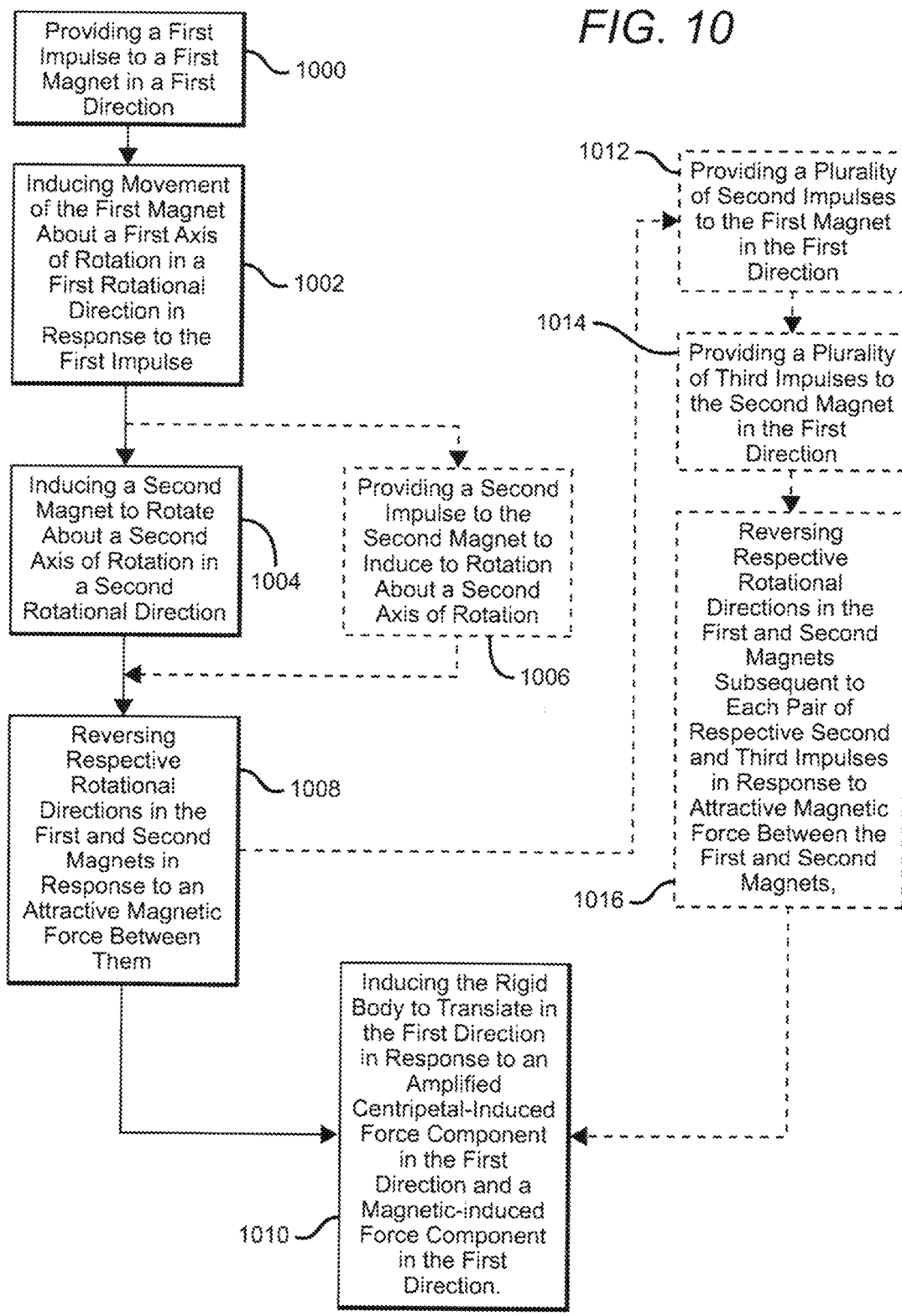
FIG. 10 is a flow chart illustrating one embodiment of a method for inducing a rigid body to translate in a first direction in response to an initial impulse and without recoil for structures such as those illustrated in FIGS. 1A-1F, FIG. 2 and FIG. 15.

FIG. 10 is a flow chart illustrating one embodiment of a planar tethered method for inducing a rigid body to translate in a first direction in response to an initial impulse and without recoil for structures such as those illustrated in FIGS. 1A-1F, FIG. 2 and FIG. 15. A first impulse may be provided to a first magnet in a first direction (block 1000) such as through the use of an electro-magnetic pulse generated by an electromagnetic pulse generator having integral electro-magnetic coils positioned about the magnet. In response to the first impulse, the first magnet is induced to move about a first axis of rotation in a first rotational direction (block 1002), such as would be the case when the first magnet may be rotatably coupled to an axis of rotation through a tether. A second magnet may be induced to rotate about a second axis of rotation in a second rotational direction (block 1004), such by momentum transfer experienced between the first and second magnets as a result of magnetic forces between them. In an alternative embodiment, an electromagnetic impulse may also be provided to the second magnet to induce rotation about the second axis of rotation (block 1006).

The respective rotational directions of the magnets may then be reversed in response to attractive magnetic force between them (block 1008). In response to an amplified centripetal-induced force component in the first direction resulting from rotation of the magnets about their respective axes of rotation, and in response to a magnetic-induced force component in the first direction, the rigid body may overcome any initial recoil impulse component in the first direction and is induced to positively translate in the first direction (block 1010).

In one embodiment, a plurality of second impulses may be provided to the first magnet in the first direction (block 1012) after its contribution to the rigid body translation has been expended. For example, after the first magnet no longer substantially contributes to momentum transfer to the rigid body, the first magnet may again be provided with an impulse about its axis of rotation. Similarly, the second magnet may be provided with a plurality of third impulses (block 1014).

Respective rotational directions of the first and second magnets may again reverse in response to attractive magnetic force between them (block 1016). Such additional initial impulses again result in a magnetic-induced force component in the first direction and an amplified centripetal-induced force component in the first direction thereby overcoming any negative initial impulse component in the first direction to produce rigid body motion in the positive first direction (block 1010).

Figure 11:
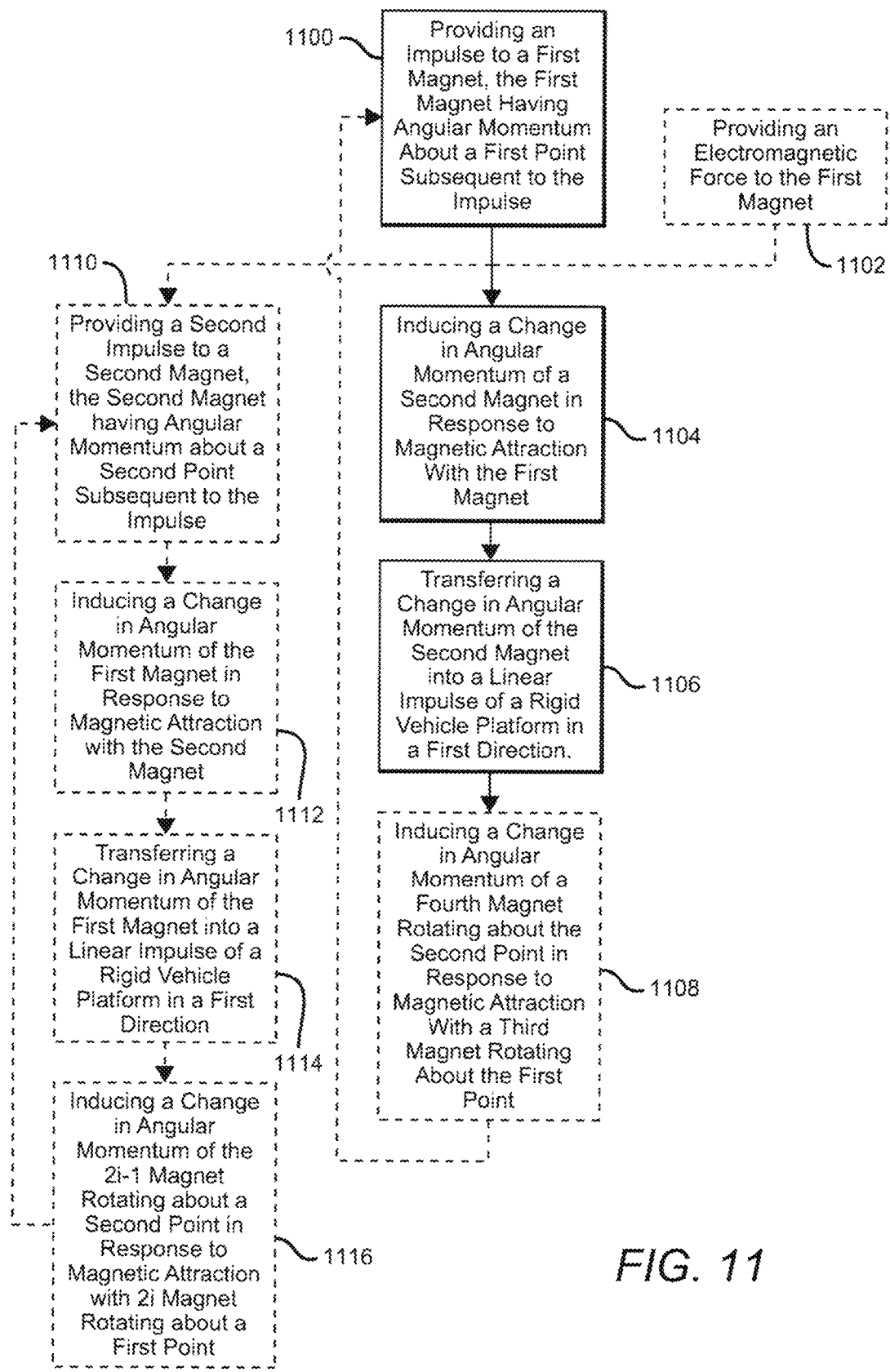
FIG. 11 is a flow diagram illustrating another embodiment of a method for inducing a rigid body to translate in a first direction in response to an initial impulse and without recoil for structures such as those illustrate din FIG. 4, FIG. 12 and FIG. 16.

FIG. 11 is a flow diagram illustrating another embodiment of a planar rigid disk and non-planar tethered rings method for inducing a rigid body to translate in a first direction in response to an initial impulse and without recoil. An impulse is provided to a first magnet (block 1100) to produce angular momentum in the first magnet about a first point. In embodiments, the first magnet may be attached to a tether rotating about a shaft, or may be coupled to a rotating disk. An electromagnetic force may be provided to the first magnet to provide the impulse (block 1102). A change of angular momentum is induced in a second magnet in response to magnetic attraction with the first magnet (block 1104), the second magnet rotating about a second point. The change in angular momentum is transferred into a linear impulse of the rigid vehicle platform (block 1106) by means of the tether or rotating disk onto which the magnets are coupled and through respective shafts coupled to the rigid vehicle platform. In embodiments other than a two magnet tethered system, such as a system of i=1 to N magnets rotating about a first point, and i=1 to N magnets rotating about a second point, a change in angular momentum may be induced in a fourth magnet (2i) rotating about the second point in response to magnetic attraction with a third magnet (2i-1) rotating about the first point (block 1108).

In an additional embodiment, after an impulse is provided to the first magnet (block 1100), a second impulse may be provided to a second magnet rotating about a second point (block 1110). Angular momentum is exchanged between the first and second magnets in response to magnetic attraction between them (block 1112), and a change in angular momentum of the first magnet is transferred into a linear impulse of a rigid vehicle platform in a first direction (block 1114).

In non-planar embodiments containing tethered rings, amplified centripetal acceleration may be induced about a fourth magnet rotating about a second point and associated tether element due to a third magnet rotating about a first point.

Figure 12A:
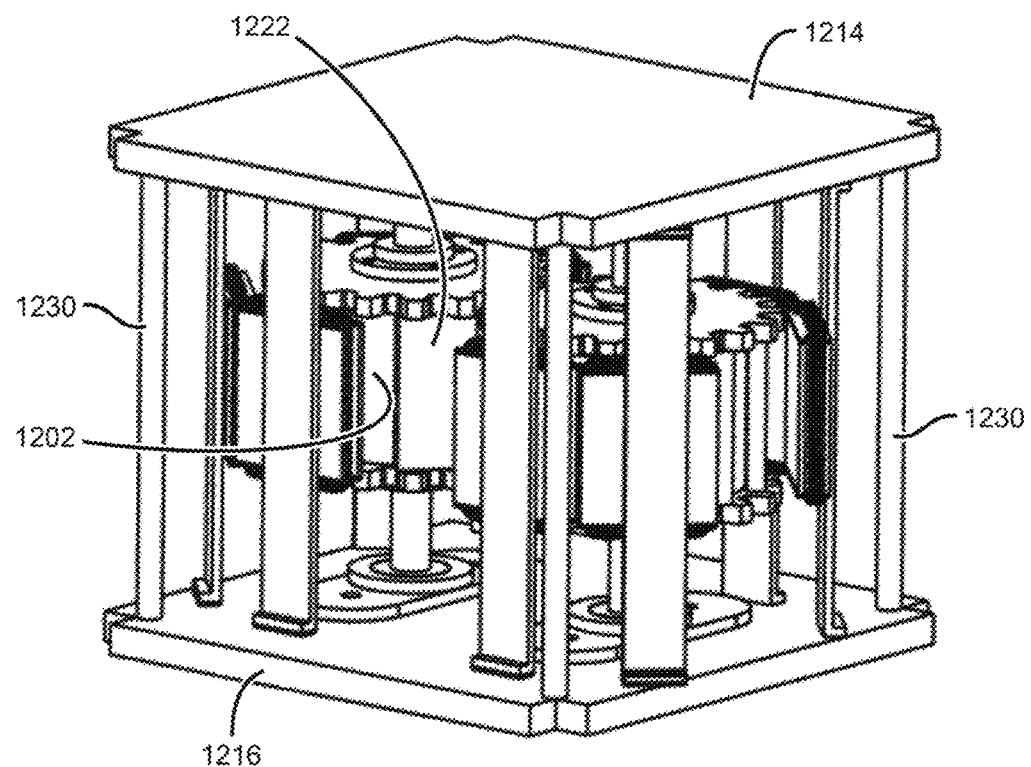
FIG. 12A is a perspective view showing another embodiment of a self-propelling apparatus that has two rotors with a plurality of magnets disposed on circumferential lateral surfaces of the rotors rather than on top planar portions of the rotors as illustrated in FIGS. 3, 4A, 4B, and 4C.
Figure 12B:
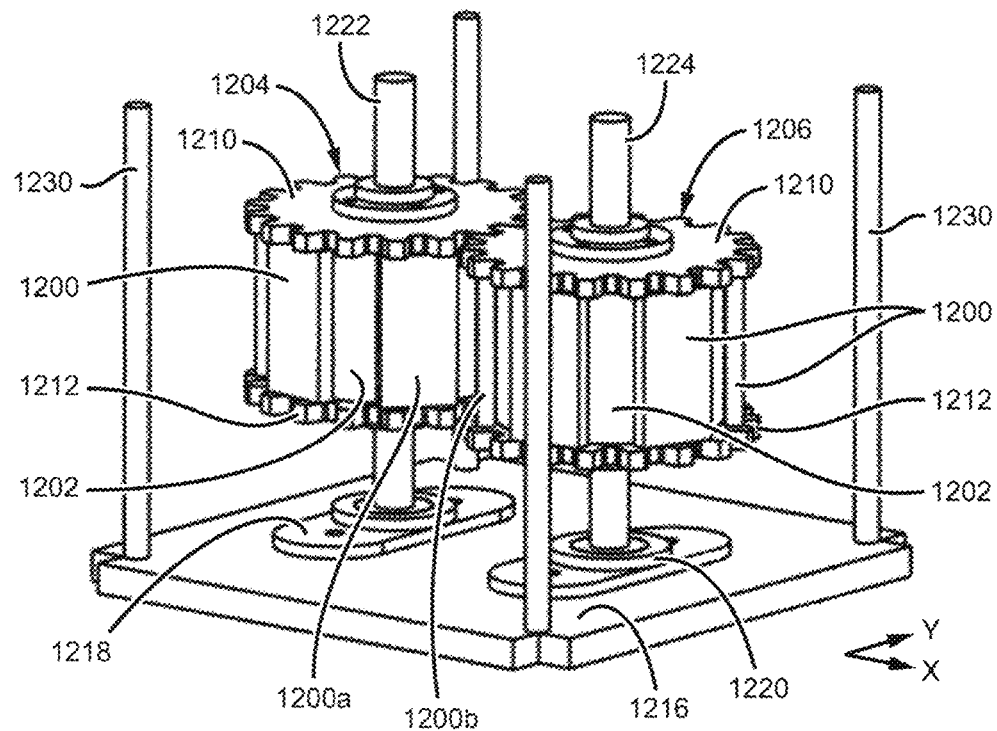
FIGS. 12B and 12C are partially disassembled views of FIG. 12A to better illustrate the inner magnets and outer coils, respectively.
Figure 12C:
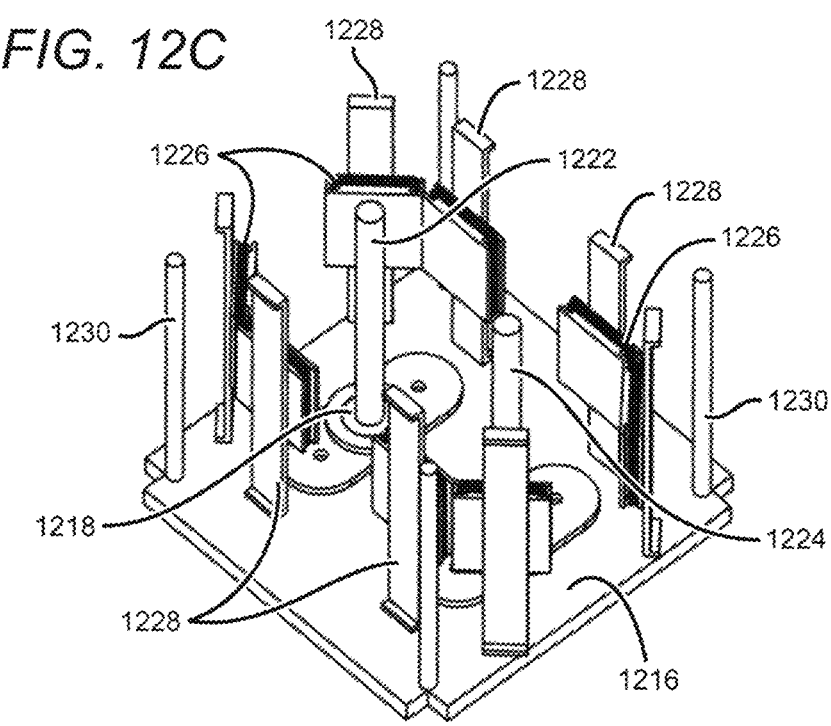

FIG. 12A illustrates a self-propelling apparatus that has a plurality of magnets disposed on circumferential lateral surfaces of two adjacent rotors rather than on top planar or mid-lateral portions of the rotors as illustrated in FIGS. 3, 4A, 4B, and 4C. FIGS. 12B and 12C are partially disassembled perspective views of the apparatus illustrated in FIG. 12A. Referring to FIGS. 12A, 12B, and 12C collectively, a plurality of magnets 1200 is coupled to respective circumferential lateral surfaces 1202 of two rotors (1204, 1206). Opposing permanent magnets (1200a, 1200b) on the first and second rotors (1204, 1206) experience a magnetic attractive force between them as they rotate. Respective top and bottom spur gears (1210, 1212) of each rotor (1204, 1206) are disposed in a cooperative arrangement whereby both first and second rotors (1204, 1206) rotate together. Each rotor (1204, 1206) is rotatably coupled to top and bottom rigid vehicle platforms (1214, 1216) through flanged bearings (1218, 1220) that guide respective shafts (1222, 1224). Each magnet 1200 may be oriented with its North-South poles aligned radially with its respective rotor (1204, 1206). Adjacent magnets on a particular rotor have magnetic poles that alternate in North/South orientation. Adjacent pairs of magnets (1200a, 1200b) on adjacent rotors (1204, 1206) are oriented with their magnetic poles flipped from one another to maintain magnetic attractive force between them. Electromagnetic coils 1226 are coupled to respective coil posts 1228 for support, and are distributed about a perimeter of each of the rotors (1204, 1206). Platform posts 1230 may fixedly couple the top and bottom platforms (1214, 1216) together.

During operation, a first impulse may be provided to one or more of the magnets 1200, such as a first magnet 1200a on a circumferential lateral surface 1202 of the first rotor 1204. The impulse may induce movement of the first magnet 1200a about the shaft 1222 (an axis of rotation) of the first rotor 1204 in a first rotational direction that may be counterclockwise. The first magnet 1200a on the first rotor 1204 will instantaneously and magnetically interact with a second magnet 1200b on the second rotor 1206, thereby inducing the second magnet 1206 to rotate about the shaft 1224 of the second rotor 1206 and providing a portion of the momentum of the first magnet 1200a to the second magnet 1200b.

While the first and second rotors (1204, 1206) are spinning in opposite directions with respect to one another, with the first rotor 1204 spinning counterclockwise and the second rotor spinning clockwise 1206, the Y-direction component of the resultant momentum exchange between interacting magnets (1200a, 1200b) will reinforce in the +Y direction while the X-direction component of the resultant force between the interacting magnets (1200*a*, 1200*b*) will cancel. This is the case for all magnet pairs travelling on the closer half arcs between rotors. The net effect of X-direction component of the magnets on the further half arcs will similarly cancel while the Y-direction component of magnets in the further half arcs will be in the −Y-direction.

However, because the magnets on the outer edges (further half arcs) are further away from their respective matched pair, the Y-direction component of the resultant momentum exchange between interacting magnets in the further half arcs will be less than the momentum exchange between the magnets in the closer half arcs. Therefore, the total net effect of the interacting forces on the shafts (1222, 1224) and top and bottom platforms (1214, 1216) will be in the +Y direction. The magnetic forces are transferred to the shafts (1222, 1224) because each rotor (1204, 1206) is a rigid body and they are rigidly fixed on the platforms (1214, 1216). By using a spur gear profile around the perimeter of each rotor (1204, 1206) the rate of rotation between the rotors (1204, 1206) is ensured to be at the same rate.

In alternate embodiments, the impulse generators do not have to be integral to the rotor gear assembly pairs. Instead, a pair of electric motors (not shown) may drive the shafts 1222, 1224 through optional respective gear boxes or a direct drive motor may be used to provide impulses to the rotors and mounted magnets.

It should be noted that an optional gear box (not shown) may be as straight forward as a shaft coupler. In some configurations, a single shaft may be used. For operation the electric motors shall turn in opposite directions. In terms of rotor rotation and thrust generation the operation of this configuration is similar to the previous embodiments. Control circuitry for externally mounted motors can be achieved with standard off the shelf components.

Figure 13:
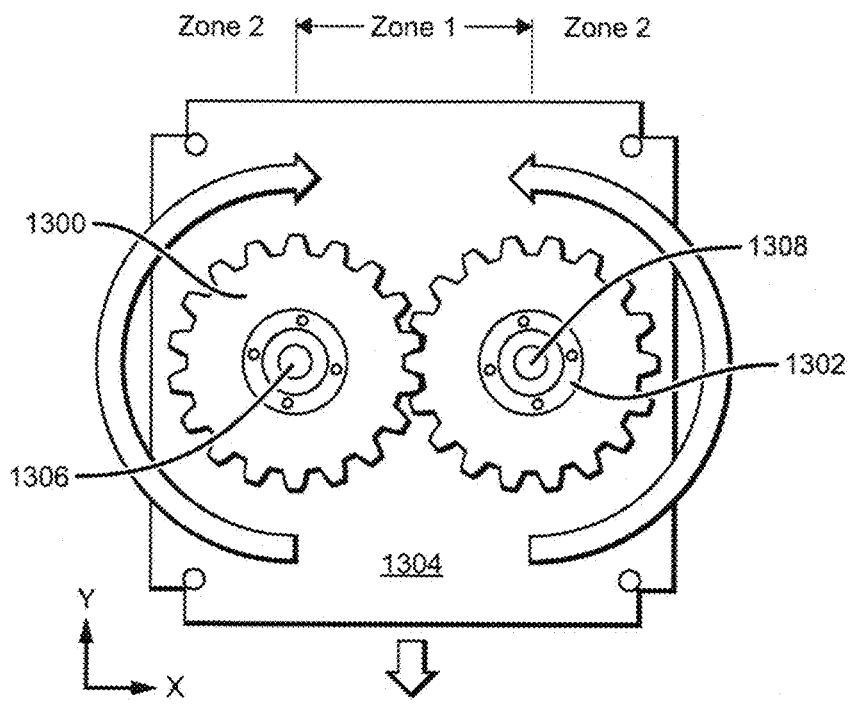
FIGS. 13 and 14 illustrate vehicle platform impulse directions induced in response to inwardly rotating and outwardly rotating rotors, respectively, as configured FIGS. 3, 4A, 4B, 4C, 6, 12A, 12B, and 12C.

FIG. 13 is a top plan view illustrating inwardly rotating rotors that induce an impulse in a rotatably coupled rigid vehicle platform in the −Y direction. First and second rotors (1300, 1302) are each rotatably coupled to the rigid vehicle platform 1304. For rotors having circumferentially-spaced magnets (not shown), such as those assemblies found in FIGS. 3, 4A, 4B, 4C, 6, 12A, 12B, and 12C, an impulse provided to the first rotor 1300 may cause rotation of the first rotor 1300 in a clockwise direction, which induces coordinated rotation of the second rotor 1302 in a counterclockwise rotation. Momentum of the magnets on the first rotor 1300 is shared with magnets on the second rotor 1302, with the total net effect of the interacting forces on respective shafts (1306, 1308) and the coupled rigid vehicle platform 1304 being in the −Y direction for the reasons described above for FIG. 3.

Figure 14:
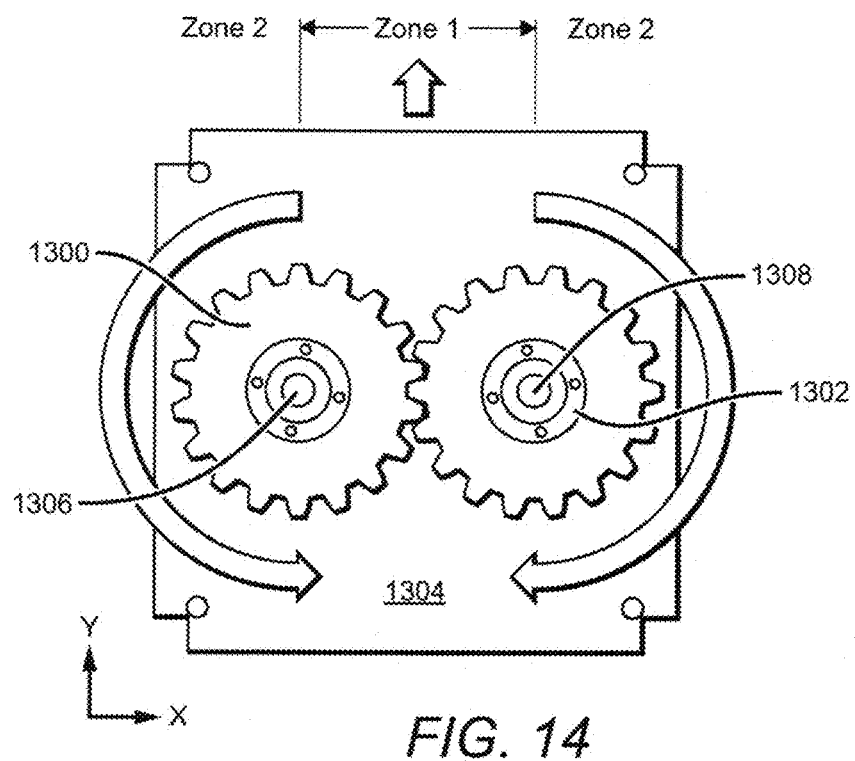

FIG. 14 is a top plan view illustrating outwardly rotating rotors that induce an impulse in rotatably coupled rigid vehicle platform in the +Y direction. An impulse may be provided to the first rotor 1300 causing rotation of the first rotor 1300 in a counterclockwise direction that induces coordinated rotation of the second rotor 1302 in a clockwise rotation. Momentum of the magnets (not shown) on the first rotor 1300 may be shared with magnets on the second rotor 1302, with the total net effect of the interacting forces on the shafts (1306, 1308) and coupled rigid vehicle platform 1304 being in the +Y direction for the reasons described above for FIG. 3.

FIGS. 15A-15E depict sequential steps in operation of a self-propelling apparatus having a system of tethers coupled to a plurality of magnets and respective impulse generators coupled to a vehicle platform. Each magnet 1500 may be coupled to a respective tether 1502. Each tether 1502 may be coupled to its respective shaft 1504 through a tether system bearing 1506, with the shafts 1506 fixedly coupled to a rigid vehicle platform 1508. Each tether 1502 may be provided with a slight amount of slack and be capable of transferring force through tension. In one implementation, the tethers 1502 are formed of unidirectional carbon fiber. Each magnet 1500 may be coupled to an annular upper rotor 1510. Castors 1512 may be mounted mid-plane to the upper rotor 1510 for vertical support of the upper rotor 1510 and rotation on an annular lower platform 1514. An electromagnetic pulse generator 1516 may be provided for each magnet 1500, with each electromagnetic pulse generator 1516 fixedly coupled to either the vehicle platform 1508 or the annulus-shaped lower platform 1514 and disposed in a position to provide an impulse to any magnet 1500 rotating beneath it as the magnets rotate about their shaft 1504 at a pre-determined position.

Figure 15A:
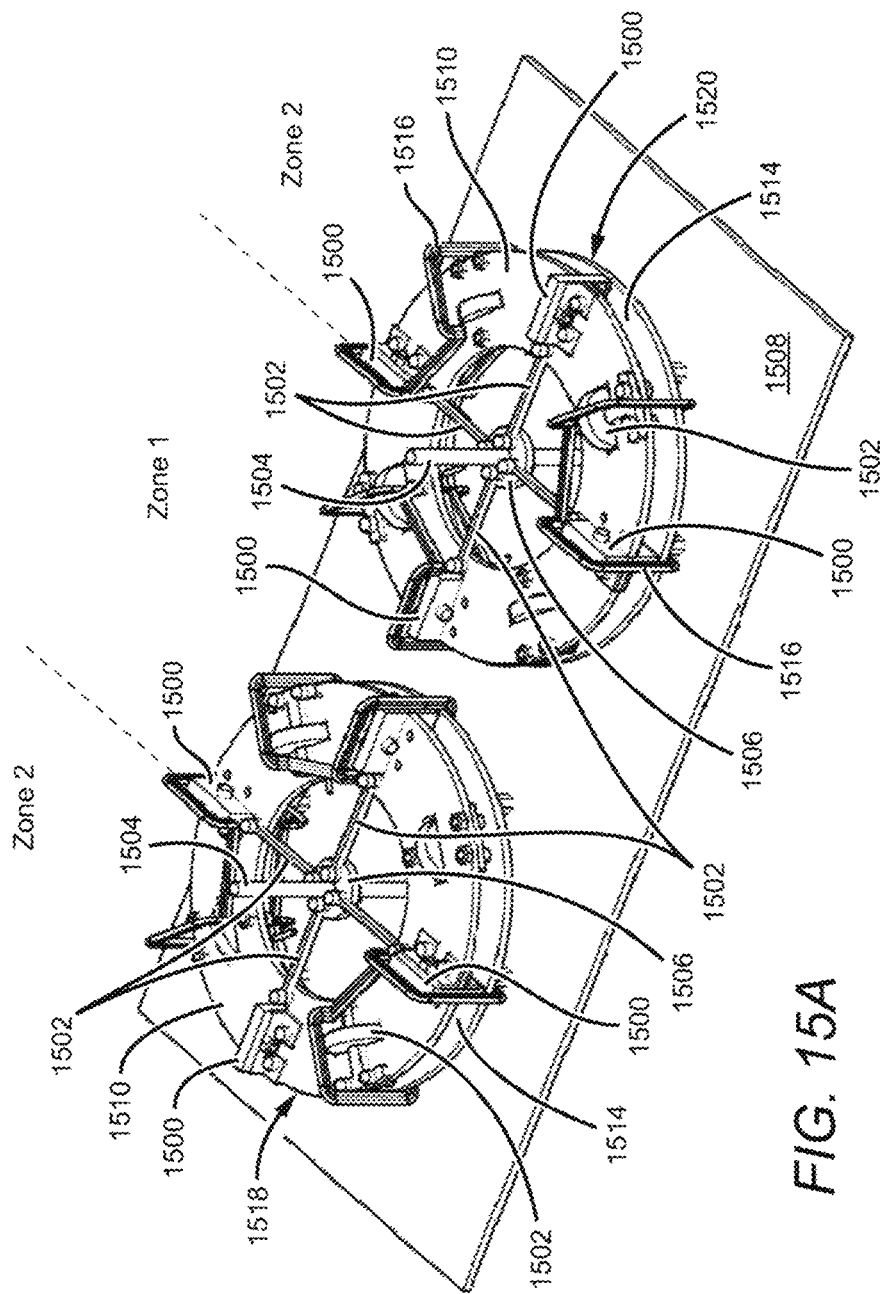
FIGS. 15A-15D depict sequential steps in operation of a planar self-propelling apparatus having a system of tethers coupled to magnets and to respective impulse generators coupled to a vehicle platform.
Figure 15B:
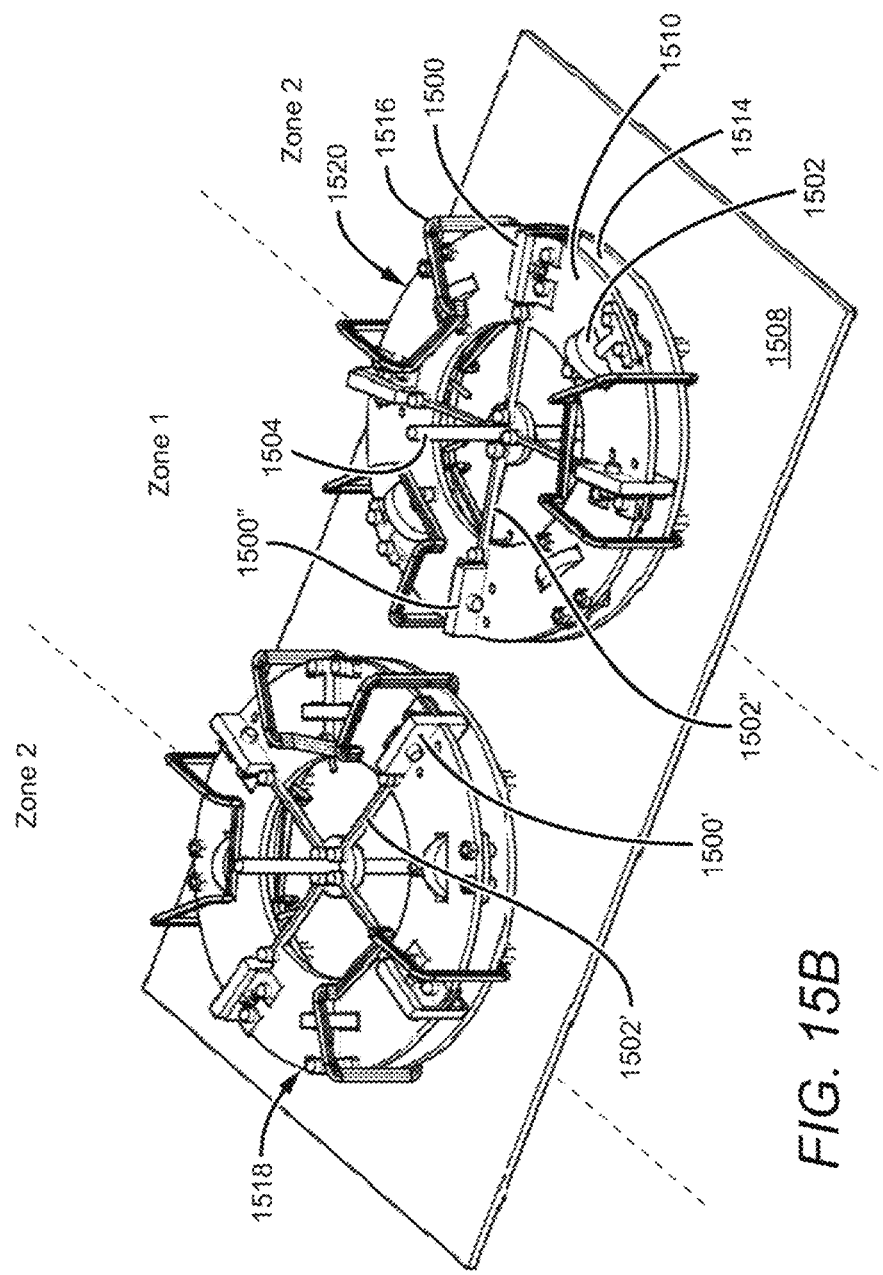
Figure 15C:
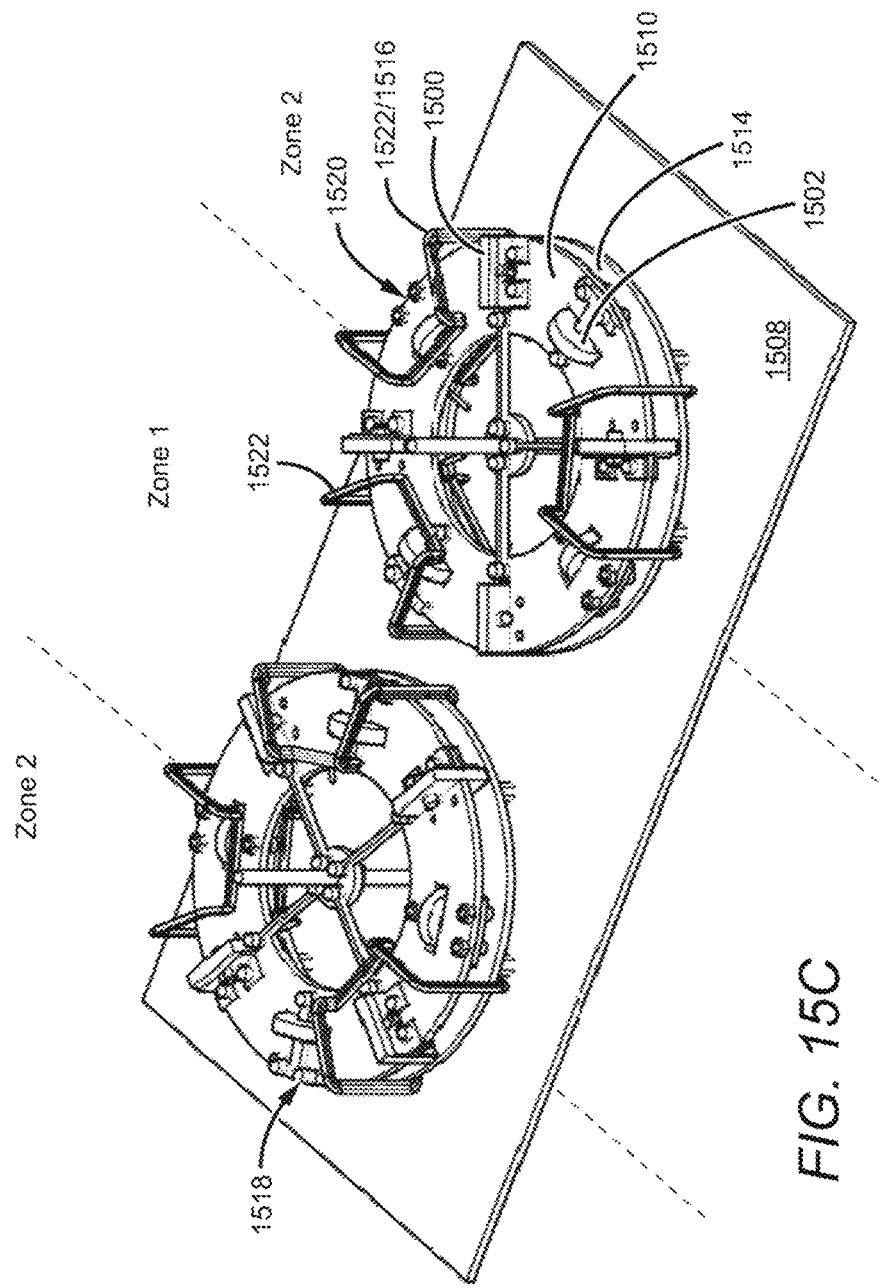
Figure 15D:
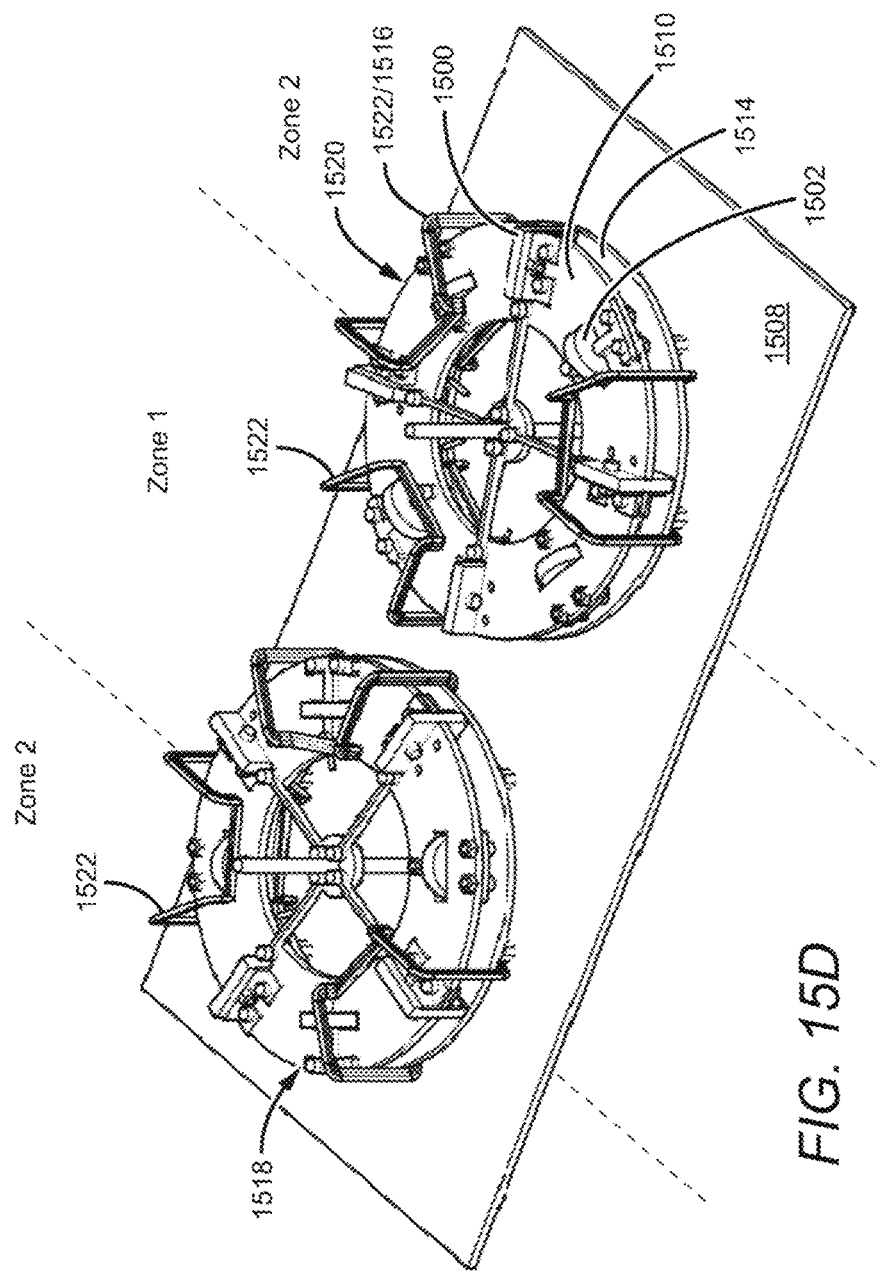

In FIG. 15A, the electromagnetic pulse generators are de-energized and the magnets 1500 are at rest. In FIG. 15B, at least one of the electromagnetic pulse generators 1516 are energized, and the magnets 1500 of the first rotor 1518 have begun to rotate counterclockwise while the magnets 1500 of the second rotor 1520 have begun to rotate clockwise to create a swinging action of the magnets. By using a secondary set of coils to create the impulse at 90 degrees to the desired motion, any recoil reaction induced by the electromagnetic pulse generator and magnet interaction onto the rigid platform 1508 would be reduced. The magnetic interaction between a first magnet 1500' on the first rotor 1518 and a second magnet 1500" on the second rotor 1520 will impart momentum to the second magnet 1500" about the second shaft 1504. The magnetic interaction between first and second magnets (1500', 1500") will amplify the centripetal force on the tether 1502' of the first magnet and the tether 1502" second magnet. In FIG. 15C, magnet attractive forces in Zone 1 stop the swinging motion and begin to swing back as illustrated in FIG. 15D. By energizing secondary coils 1522, briefly, when the magnets are returning to their original position, over swing effects may be minimize.

Figure 16B:
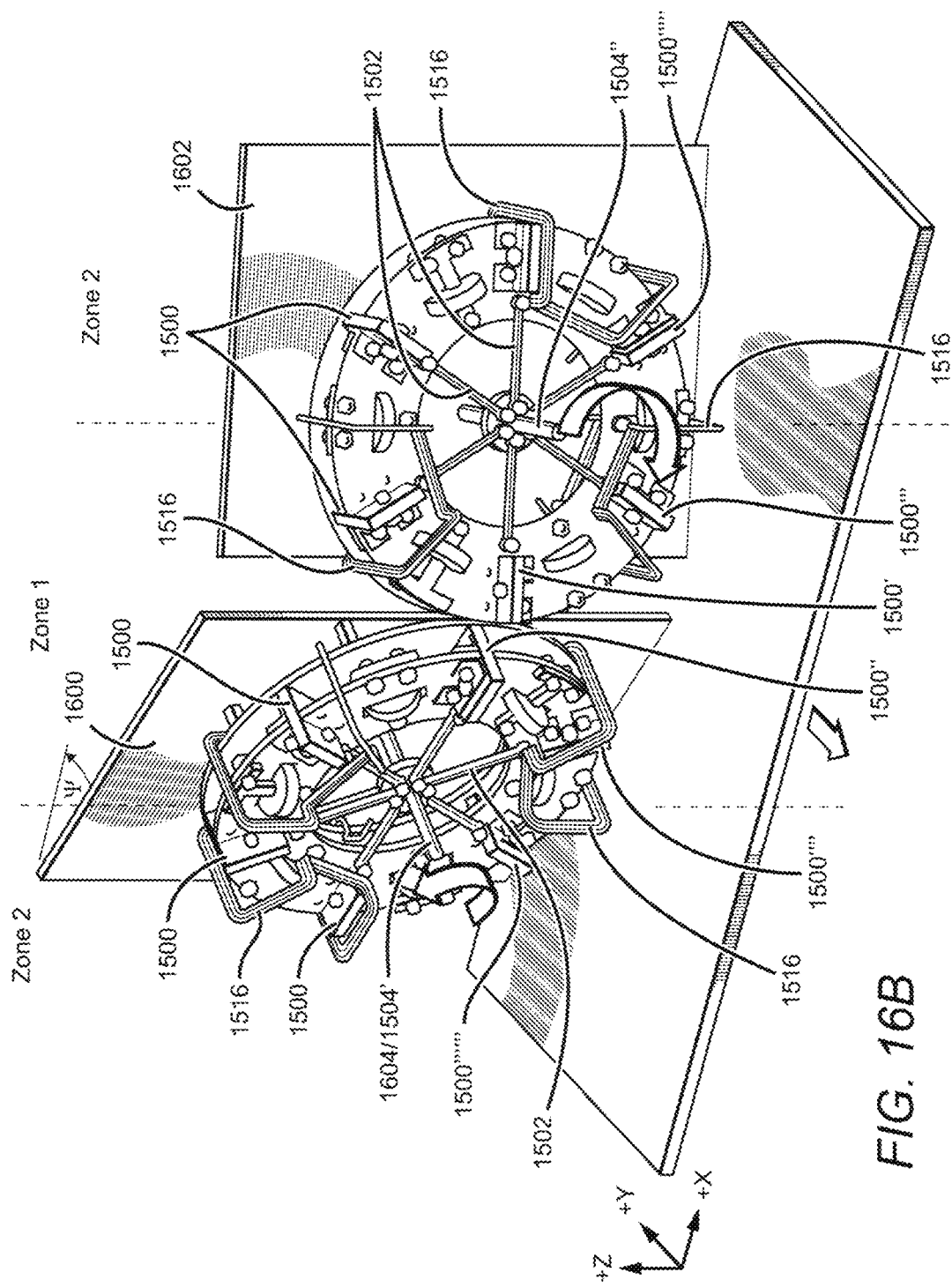

FIGS. 16A and 16B are perspective views illustrating the rotors and associated components illustrated in FIGS. 15A-15D, but with first and second rotors disposed in a non-planar arrangement to provide a continuously rotating system.

Each magnet 1500 may be coupled to its respective shaft 1504 through a tether 1502 and tether system bearing 1056. The shafts 1506 may be fixedly coupled to the rigid vehicle platform 1508 through respective rigid backplanes (1600, 1602) that may be non-planar to the platform 1508, with the shafts 1506 disposed at an angle from one another. Each tether 1502 may be provided with a slight amount of slack.

As used herein, tethers may be sufficiently elastic in torsion and bending but substantially in-elastic in tension to support rotation of the magnets at a substantially constant radius of rotation, such as would be the case if composed of unidirectional carbon fibers, interwoven fibers (i.e., a rope or string), a chain having links, or other high aspect structure. In one implementation, the tethers 1502 are formed of unidirectional carbon fiber.

As in FIGS. 15A-15D, each magnet 1500 may be coupled to an annular upper rotor 1510. Castors 1512 may be mounted mid-plane to the upper rotor 1510 for vertical support of the upper rotor 1510 and rotation on the annular lower platform 1514. The electromagnetic pulse generator 1516 may be provided for each magnet 1500, with each electromagnetic pulse generator 1516 fixedly coupled to either its respective rigid backplanes (1600, 1602) or to its respective annulus-shaped lower platform 1514 and disposed in a position to provide an impulse to any magnet 1500 rotating beneath it as the magnets rotate about their shaft 1504 at a pre-determined position.

During operation, an impulse may be imparted to a first magnet 1500' to set in angular motion in a first direction (see FIG. 16B, indicated by a clockwise arrow). While the first magnet 1500' travels into Zone 1 approaching a second magnet 1500" which has been given an impulse by and is rotating about a second point 1604 in a second rotational direction (see FIG. 16B, indicated by a counterclockwise arrow) their tethers 1502 will jointly experience an amplified centripetal force due to attractive magnetic forces. As further impulses are imparted to third and fifth magnets (1500''', 1500''''), motion will continue in the same rotation direction. Subsequent interaction between fourth and sixth magnets (given an impulse by an electromagnetic system) rotating about the second point 1604 and associated tethers will experience the same amplified centripetal force.

Because each electromagnetic pulse generator 1516 on each of the first and second rotors (1518, 1520) and are energized to provide the same impulse. The electromagnetic pulse generators 1516 may be disposed symmetrically about the first and second rotational points so that recoil forces generated from each pulse will cancel out to reduce rotational moments transmitted to the backplanes (1600, 1602) and rigid platform 1508. This behavior is different from the planar configuration/embodiment.

The effect of the amplified centripetal force experienced by tethers in Zone 1 may create slack in the tethers 1502 moving through Zone 2. This will create a difference in the total net radial force experienced by each respective shaft (1504', 1504"). The unbalanced force distribution will create an impulse on the rigid platform in the negative Y-axis direction. The impulse will be a function of the tension in the tethers and the sine of the angle the planes are offset from the z plane. If we use to describe this angular offset, then the impulse will be of the form Impulse_y=Tension*sin($\psi$). In this configuration a Hall Effect magnet sensor can be used in place of an optical sensor to send information to coil control circuit(s) (not shown). Impulses can also be imparted to second magnet (1502") and subsequent fourth (1502'''') and sixth (1502'''''') magnets by electromagnetic pulse generators 1516 to maintain continuous angular motion.

While various embodiments of the invention have been described, it will be apparent to those of ordinary skill in the art that many more embodiments and implementations are possible that are within the scope of this invention.

I claim:

1. A self-propelling method, comprising:
   providing an impulse to a first magnet, the first magnet having angular momentum about a first point subsequent to the impulse; and
   inducing a change in angular momentum of a second magnet in response to magnetic attraction with the first magnet, the second magnet rotating about a second point;
   wherein the first and second magnets are rotatably coupled to a rigid vehicle platform at the first and second points, and the inducing a change in angular momentum of the second magnet results in a transferred linear impulse on the rigid vehicle platform to impart thrust in a first direction.

2. The method of claim 1, further comprising:
   inducing a change in angular momentum of a fourth magnet rotating about the second point in response to magnetic attraction with a third magnet rotating about the first point;
   wherein the inducing a change in angular momentum of a fourth magnet rotating about the second point reinforces the linear impulse of the rigid vehicle platform in the first direction.

3. The method of claim 1, wherein the providing an impulse to a first magnet comprises providing an electromagnetic force to the first magnet.

4. The method of claim 3, wherein the first magnet is coupled to a first rotating disk and the second magnet is coupled to a second rotating disk.

5. The method of claim 4, wherein the second disk is rotatably coupled to the rigid vehicle platform through a shaft and the change of angular momentum of the second magnet has a linear momentum component in the first direction, a component of the linear impulse of the rigid vehicle platform received from the second magnet through the shaft.

6. A method of self-propulsion, comprising:
   providing a first impulse to a first magnet in a first direction, the impulse inducing movement of the first magnet about a first axis of rotation in a first rotational direction;
   inducing a second magnet to rotate about a second axis of rotation in a second rotational direction, the first and second magnets inducing an amplified centripetal-induced force component to impart thrust in the first direction on a rigid body coupled between the first and second axis of rotation; and
   reversing respective rotational directions in the first and second magnets in response to attractive magnetic force between them, the attractive magnetic force and inducing a magnetic-induced force component in the rigid body in the first direction;
   wherein the rigid body translates in the first direction despite partial recoil from the first impulse.

7. The method of claim 6, wherein the step of inducing a second magnet to rotate about a second point in second rotational direction comprises providing a second impulse to the second magnet.

8. The method of claim 7, wherein the step of providing a second impulse to the second magnet comprises generating the second impulse using an electromagnetic force.

9. The method of claim 6, wherein the first impulse to the first magnet is generated using an electromagnetic force.

10. The method of claim 6, wherein the first magnet is coupled about the first point through a first tether.

11. The method of claim 10, wherein the first tether comprises a plurality of tethers.

12. The method of claim 6, wherein the second magnet is coupled about the second point through a second tether.

13. The method of claim 12, wherein the second tether comprises a plurality of tethers.

14. The method of claim 12, further comprising:
   providing a plurality of second impulses to the first magnet in the first direction, each of the plurality of second impulses inducing movement of the first magnet about the first axis of rotation in the first rotational direction;
   providing a plurality of third impulses to the second magnet in the first direction, each of the plurality of third impulses inducing movement of the second magnet about the second axis of rotation in the second rotational direction; and reversing respective rotational directions in the first and second magnets subsequent to each pair of respective second and third impulses in response to attractive magnetic force between the first and second magnets, the attractive magnetic force inducing a magnetic-induced force component in the rigid body in the first direction;

wherein the rigid body experiences acceleration in the first direction despite partial recoil from the second and third impulses.

15. The method of claim 14, wherein acceleration of the rigid body in the first direction is controlled by control of a frequency of the first and second impulses.

16. The method of claim 6, wherein the first magnet is coupled about the first point through a rigid disk.

17. A self-propelling apparatus, comprising:
a first magnet rotatable about a first rotational axis at a radius (R);
a second magnet rotatable about a second rotational axis to a position magnetically adjacent to the first magnet;
an electromagnetic pulse generator disposed at the radius (R) from the first rotational axis to provide the first magnet with an impulse; and
a rigid vehicle platform coupled between the first and second magnets;
wherein an electromagnetic impulse provided to the first magnet by the electromagnetic pulse generator results in increased angular momentum of the first magnet, a sharing of a linear momentum component in a first direction between the first and second magnets through magnetic force, and sharing of the linear momentum component in the first direction with the rigid vehicle platform to impart thrust to translate the rigid vehicle platform in the first direction.

18. The apparatus of claim 17, wherein the first magnet is disposed on a first rotatable disk.

19. The apparatus of claim 18, further comprising a first plurality of first magnets on the first rotatable disk.

20. The apparatus of claim 19, wherein the second magnet is disposed on a second rotatable disk.

21. The apparatus of claim 20, further comprising a second plurality of second magnets on the second rotatable disk.

22. The apparatus of claim 21, wherein the first and second disks are cooperatively connected to rotate at the same rotational rate.

23. The apparatus of claim 22, wherein each of the first and second disks are first and second rotors, respectively, each of the first and second rotors having an integrated spur gear profile.

24. The apparatus of claim 17, wherein the first magnet is disposed on an armature.

25. The apparatus of claim 24, wherein the armature is at least one tether.

* * * * *